United States Patent
Watabe et al.

(10) Patent No.: US 7,154,707 B2
(45) Date of Patent: Dec. 26, 2006

(54) THIN FILM MAGNETIC HEAD AND MAGNETIC RECORDING APPARATUS

(75) Inventors: Yuichi Watabe, Chuo-ku (JP); Norikazu Ota, Chuo-ku (JP); Yasuyuki Notsuke, Chuo-ku (JP); Susumu Aoki, Chuo-ku (JP); Tetsuya Roppongi, Chuo-ku (JP); Naoto Matono, Saku (JP)

(73) Assignees: TDK Corporation, Tokyo (JP); SAE Magnetics (H.K) Ltd., Hong Kong (CN)

( * ) Notice: Subject to any disclaimer, the term of this patent is extended or adjusted under 35 U.S.C. 154(b) by 404 days.

(21) Appl. No.: 10/805,408

(22) Filed: Mar. 22, 2004

(65) Prior Publication Data

US 2004/0190197 A1 Sep. 30, 2004

(30) Foreign Application Priority Data

Mar. 26, 2003 (JP) ............................. 2003-085960

(51) Int. Cl.
*G11B 5/127* (2006.01)

(52) U.S. Cl. .................... 360/126; 360/125; 360/122

(58) Field of Classification Search ................ 360/122, 360/125, 126

See application file for complete search history.

(56) References Cited

U.S. PATENT DOCUMENTS

| | | | |
|---|---|---|---|
| 4,656,546 A | 4/1987 | Mallory | |
| 6,101,067 A | 8/2000 | Matsuzono et al. | |
| 6,594,112 B1 * | 7/2003 | Crue et al. .................. | 360/126 |
| 6,884,148 B1 * | 4/2005 | Dovek et al. .................. | 451/5 |
| 2002/0170165 A1 * | 11/2002 | Plumer et al. ........... | 29/603.14 |
| 2005/0068673 A1 * | 3/2005 | Lille .......................... | 360/126 |

FOREIGN PATENT DOCUMENTS

| | | |
|---|---|---|
| JP | A 5-325137 | 12/1993 |
| JP | A 6-236526 | 8/1994 |
| JP | 08153305 A * | 6/1996 |
| JP | 2002100001 A * | 4/2002 |
| JP | A-2002-100005 | 4/2002 |
| JP | A-2002-100007 | 4/2002 |
| JP | A-2002-298309 | 10/2002 |

* cited by examiner

*Primary Examiner*—William J Klimowicz
(74) *Attorney, Agent, or Firm*—Oliff & Berridge, PLC

(57) ABSTRACT

Provided is a thin film magnetic head capable of securing recording characteristics even in the case where a return pole layer is disposed on a medium-outgoing side of the pole layer. The return yoke layer is disposed on a trailing side of the pole layer, and a neck height NH is within a range of NH≦W1 (a width of a front end portion in a main pole layer)+0.05 µm, and a height ratio (a ratio of the neck height NH to a throat height TH) NH/TH is within a range of 0.5<NH/TH<1.6. Thereby, the neck height NH and the height ratio NH/TH which have an influence on the recording characteristics can become appropriate, so even if the thickness of the gap layer is 0.2 µm or less to bring the return yoke layer closer to the pole layer, overwrite characteristics can be secured.

9 Claims, 16 Drawing Sheets

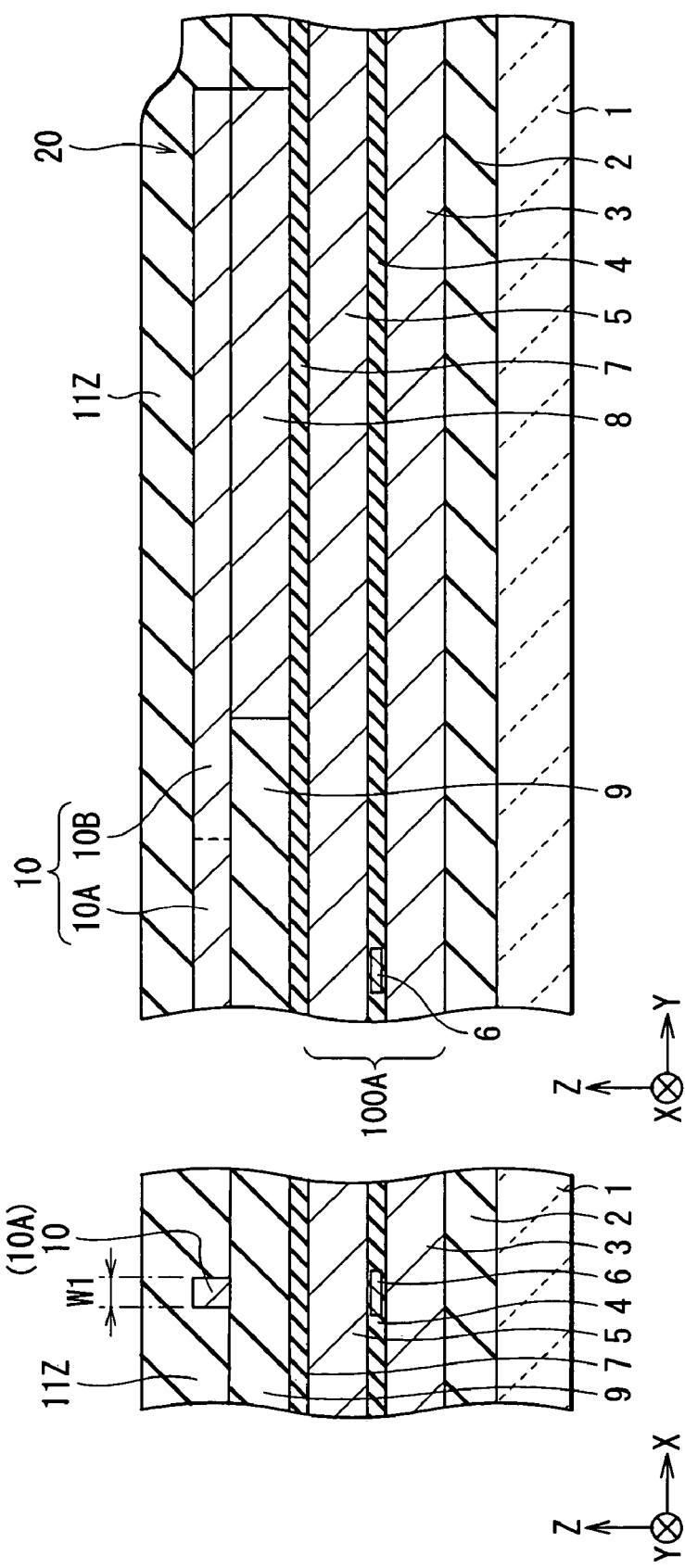

THIN FILM MAGNETIC HEAD AND MAGNETIC RECORDING APPARATUS

BACKGROUND OF THE INVENTION

1. Field of the Invention

The present invention relates to a thin film magnetic head comprising at least an inductive magnetic transducer for recording, and a magnetic recording apparatus comprising the thin film magnetic head.

2. Description of the Related Art

In recent years, an improvement in performance of a thin film magnetic head has been sought in accordance with an increase in the areal density of a magnetic recording medium (hereinafter simply referred to as "recording medium") such as a hard disk. As recording systems of the thin film magnetic head, for example, a longitudinal recording system in which a signal magnetic field is oriented in an in-plane direction (a longitudinal direction) of a recoding medium and a perpendicular recording system in which the signal magnetic field is oriented in a direction perpendicular to a surface of the recording medium are well known. At present, the longitudinal recording system is widely used, but in consideration of market forces in accordance with an improvement in areal density, it is assumed that the perpendicular recording system instead of the longitudinal recording system holds promise for the future, because the perpendicular recording system can obtain advantages that higher linear recording density can be achieved and that a recording medium in which data has been already recorded has resistance to thermal decay effects.

A main part of the perpendicular recording system thin film magnetic head comprises, for example, a thin film coil generating a magnetic flux, a pole layer emitting the magnetic flux generated in the thin film coil to outside to execute a recording process, and a return yoke layer (return pole layer) returning the magnetic flux which is emitted from the pole layer to magnetize a recording medium. As the thin film magnetic head of this kind, for example, some thin film magnetic heads in which the return yoke layer is disposed on a trailing side (a medium-outgoing side) of the pole layer are known (refer to U.S. Pat. No. 4,656,546, Japanese Patent Application Publication No. Hei 05-325137 and Japanese Patent Application Publication No. Hei 06-236526, for example). In these thin film magnetic heads, when the magnetic flux is emitted from the pole layer, a component expanding to the surroundings in the magnetic flux emitted from around an edge of the pole layer on the trailing side flows into the return yoke layer, and as a result, the expansion of the magnetic flux can be prevented. Therefore, compared to a thin film magnetic head comprising no return yoke layer, a gradient of a recording magnetic field in proximity to a recording-medium-facing surface (air bearing surface) becomes steep, so as a result, the thin film magnetic head comprising the return yoke layer can obtain an advantage that a SN (Signal to Noise) ratio can be improved.

In order to put the perpendicular recording system thin film magnetic head into widespread use, it is required to stably secure recording characteristics. However, in a conventional thin film magnetic head in which the return yoke layer is disposed on the trailing side of the pole layer, the SN ratio is improved according to the presence of the return yoke layer, but when the return yoke layer is too close to the pole layer, most of the magnetic flux emitted from the pole layer directly flows into the return yoke layer without reaching the recording medium, so consequently, recording magnetic field strength declines, thereby overwrite characteristics may decline. Therefore, in the thin film magnetic head comprising the return yoke layer on the trailing side of the pole layer, it is desired to establish a technique for making possible to secure the recording characteristics.

SUMMARY OF THE INVENTION

In view of the foregoing, it is an object of the invention to provide a thin film magnetic head capable of securing recording characteristics even in the case where a return pole layer is disposed on a medium-outgoing side of a pole layer, and a magnetic recording apparatus comprising the thin film magnetic head.

A thin film magnetic head according to the invention comprises: a thin film coil generating a magnetic flux; an insulating layer electrically separating the thin film coil from its surroundings; a pole layer including a first pole layer portion and a second pole layer portion, and emitting the magnetic flux generated in the thin film coil toward the recording medium, the first pole layer portion extending from a recording-medium-facing surface to face a recording medium moving in a predetermined direction of medium movement to a direction away from the recording-medium-facing surface and having an uniform width determining a recording track width, the second pole layer portion being connected to the rear of the first pole layer portion and having a larger width than that of the first pole layer portion; and a return pole layer being disposed on a medium-outgoing side of the pole layer in the direction of medium movement so as to face the pole layer with a gap layer in between on a side closer to the recording-medium-facing surface and to be connected to the pole layer in a back gap on a side farther from the recording-medium-facing surface, the return pole layer returning the magnetic flux emitted from the pole layer to magnetize the recording medium, wherein assuming that a width of the first pole layer portion in the pole layer is W1 (µm), and a distance between the recording-medium-facing surface and a widening position where the width of the pole layer expands from the first pole layer portion to the second pole layer portion is NH (µm), and a distance between the recording-medium-facing surface and the forefront end position of the insulating layer is TH (µm), the distance NH is within a range of NH ≦W1+ 0.05 µm, and a distance ratio NH/TH is within a range of 0.5<NH/TH<1.6.

Herein, when the movement of the recording medium toward a predetermined direction of medium movement is considered as a flow, a "medium-outgoing side" means a side where the flow outgoes, and is generally called a "trailing side". On the other hand, a side opposite to the medium-outgoing side, that is, a side where the flow incomes means a "medium-incoming side", and is generally called a "leading side".

A magnetic recording apparatus according to the invention, comprises: a recording medium; and a thin film magnetic head magnetically recording information on the recording medium, and the thin film magnetic head comprises: a thin film coil generating a magnetic flux; an insulating layer electrically separating the thin film coil from its surroundings; a pole layer including a first pole layer portion and a second pole layer portion, and emitting the magnetic flux generated in the thin film coil toward the recording medium, the first pole layer portion extending from a recording-medium-facing surface to face a recording medium moving in a predetermined direction of medium movement to a direction away from the recording-medium-facing surface and having an uniform width determining a recording track width, the second pole layer portion being connected to the rear of the first pole layer portion and having a larger width than that of the first pole layer portion; and a return pole layer being disposed on a medium-outgoing side of the pole layer in the direction of medium movement so as to face the pole layer with a gap layer in between on a side closer to the recording-medium-facing surface and to be connected to the pole layer in a back gap on a side farther from the recording-medium-facing surface, the return pole layer returning the magnetic flux emitted from the pole layer to magnetize the recording medium, and assuming that a width of the first pole layer portion in the pole layer is W1 ($\mu$m), and a distance between the recording-medium-facing surface and a widening position where the width of the pole layer expands from the first pole layer portion to the second pole layer portion is NH ($\mu$m), and a distance between the recording-medium-facing surface and the forefront end position of the insulating layer is TH ($\mu$m), the distance NH is within a range of NH W1$\leq$0.05 $\mu$m, and a distance ratio NH/TH is within a range of 0.5<NH/TH<1.6.

In the thin film magnetic head or the magnetic recording apparatus according to the invention, in the case where the return pole layer is disposed on the medium-outgoing side of the pole layer, a distance NH and a distance ratio NH/TH which have an influence on recording characteristics can become appropriate, so overwrite characteristics and a SN ratio can be secured.

Other and further objects, features and advantages of the invention will appear more fully from the following description.

BRIEF DESCRIPTION OF THE DRAWINGS

FIGS. 5A and 5B are sectional views for describing a step following the step of FIGS. 4A and 4B;

DETAILED DESCRIPTION OF THE PREFERRED EMBODIMENTS

Preferred embodiments of the invention will be described in more detail below referring to the accompanying drawings.

[First Embodiment]

Figures 1A, 1B:
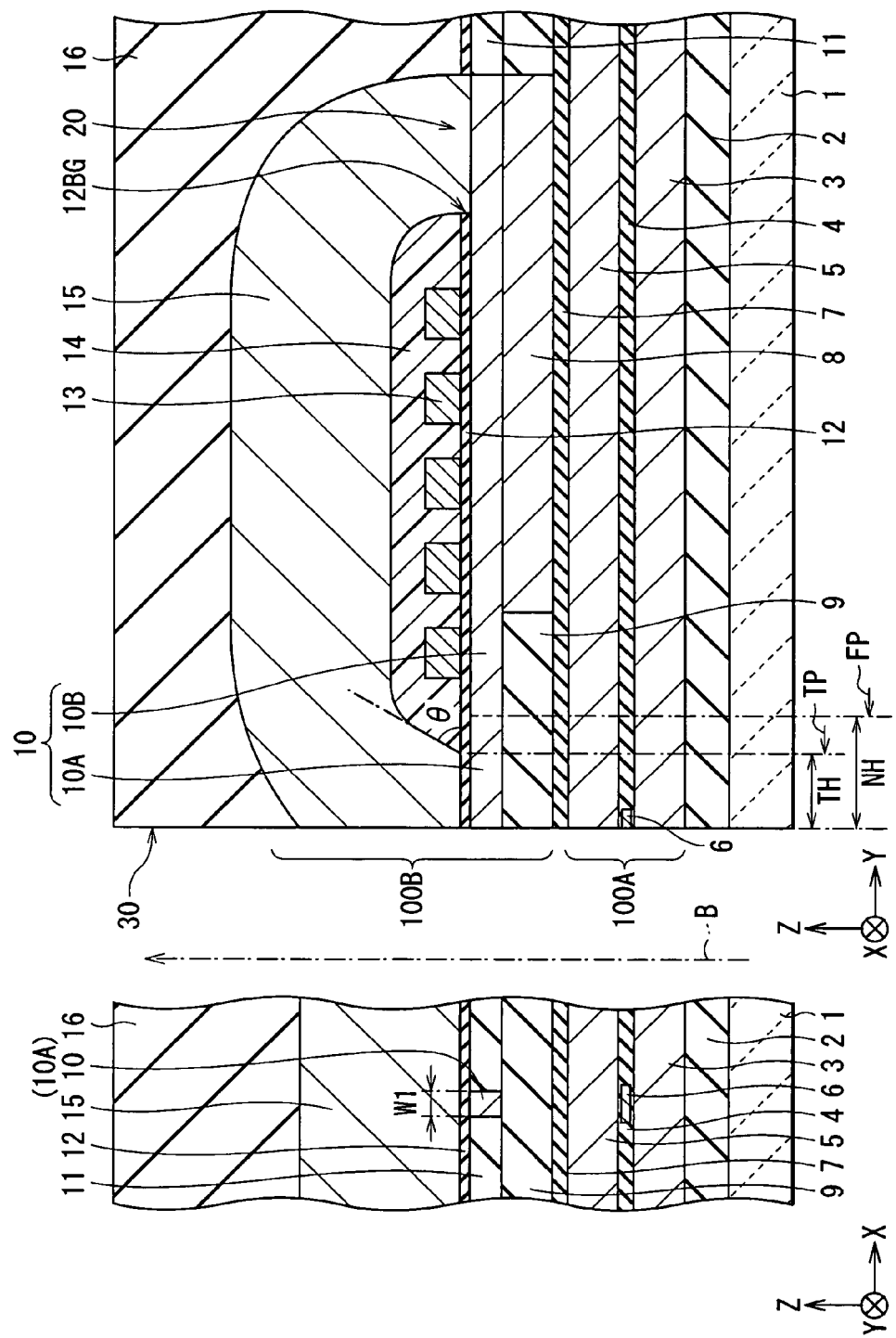
FIGS. 1A and 1B are sectional views of a thin film magnetic head according to a first embodiment of the invention.
Figure 2:
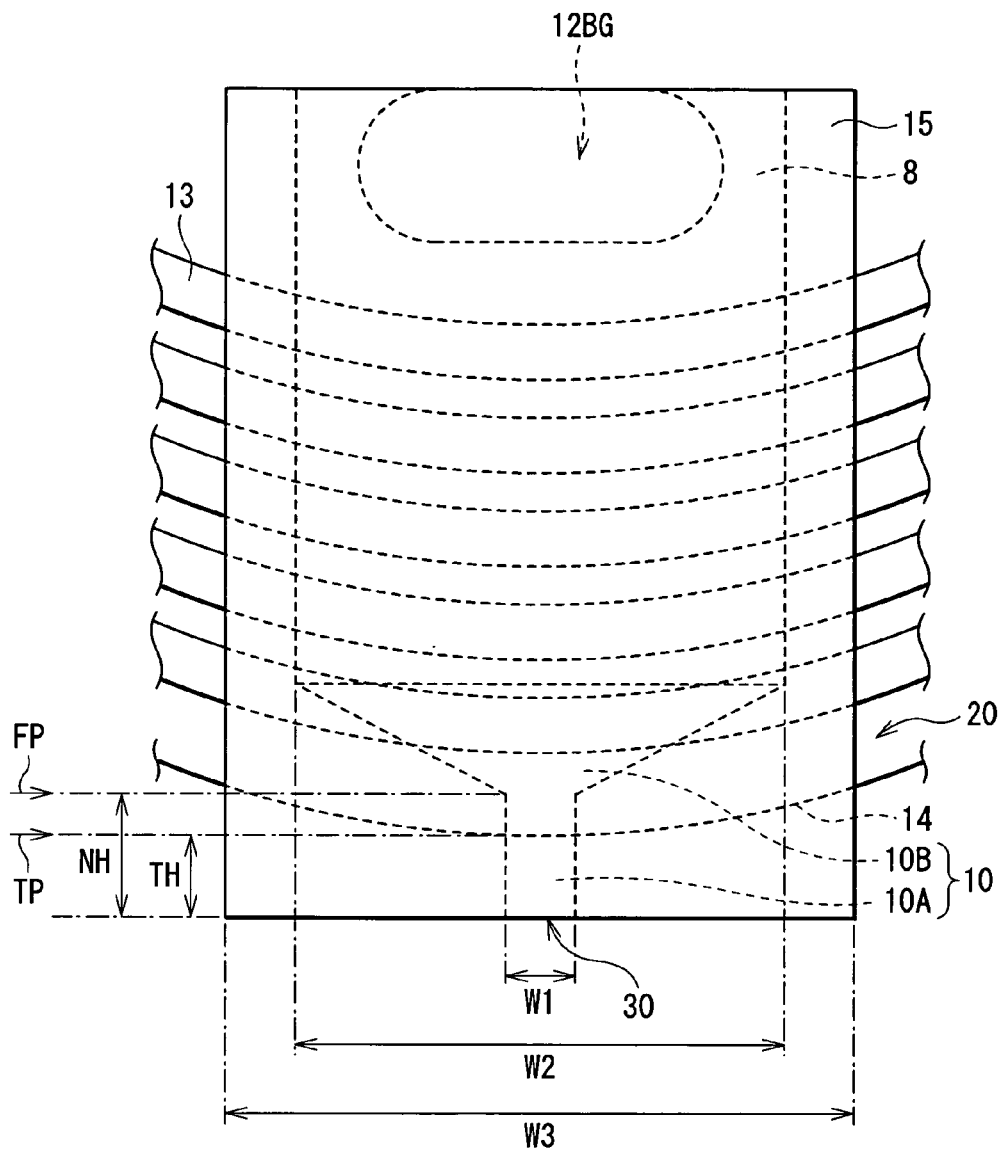
FIG. 2 is a plan view of a main part of the thin film magnetic head shown in FIGS. 1A and 1B.
Figure 3:
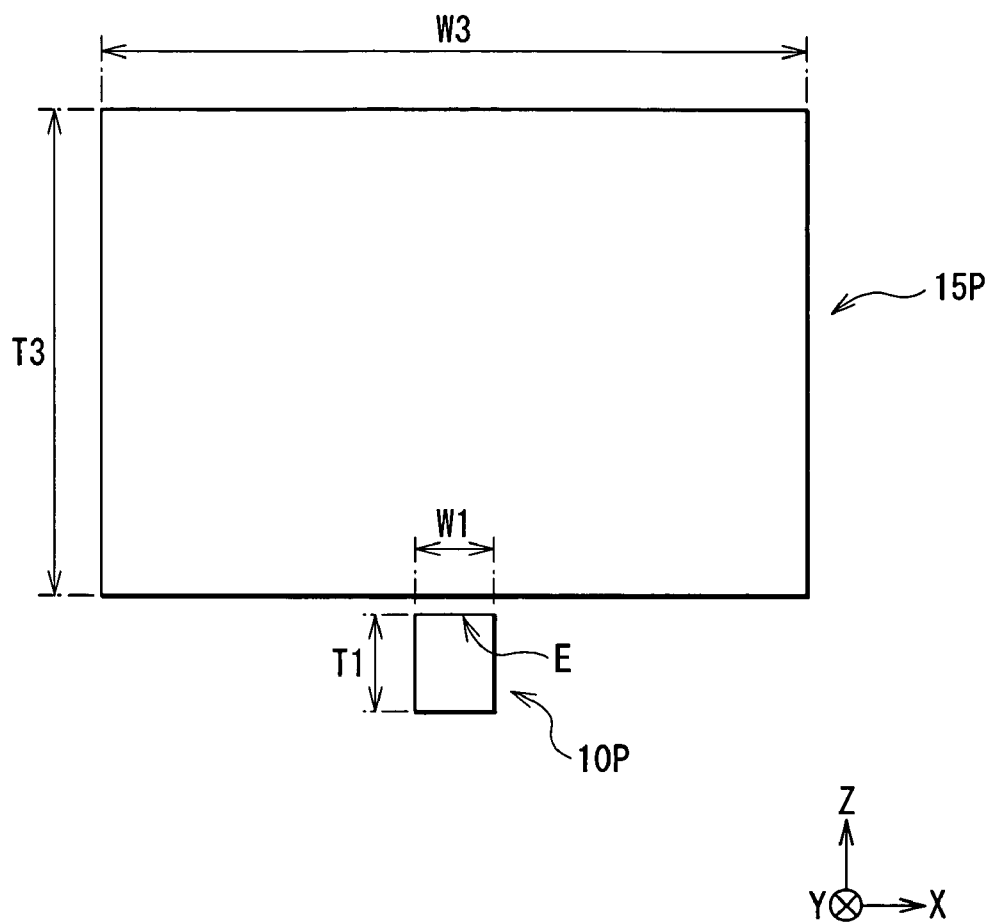
FIG. 3 is an enlarged plan view of an exposed surface of the main part of the thin film magnetic head shown in FIG. 2.

At first, referring to FIGS. 1A and 1B through 3, the structure of a thin film magnetic head according to a first embodiment of the invention will be described below. FIGS. 1A and 1B are sectional views of the thin film magnetic head, and FIG. 1A is a sectional view parallel to an air bearing surface 30, and FIG. 1B is a sectional view perpendicular to the air bearing surface 30. FIG. 2 is a plan view of a main part of the thin film magnetic head shown in FIGS. 1A and 1B, and FIG. 3 is an enlarged plan view of an exposed surface of the main part. An up arrow B shown in FIGS. 1A and 1B indicates a direction where a recording medium (not shown) relatively moves with respect to the thin film magnetic head, that is, a direction of movement of the recording medium (direction of medium movement).

In the following description, a distance in an X-axis direction, a distance in a Y-axis direction and a distance in a Z-axis direction in FIGS. 1A and 1B through 3 are expressed as "a width", "a length" and "a thickness or a height", respectively. Further a side closer to the air bearing surface 30 in the Y-axis direction is expressed as "front or frontward", and the opposite side is expressed as "rear or rearward". In FIG. 4 or later drawings, these directions and sides are expressed as the same.

The thin film magnetic head is, for example, a composite head capable of implementing two functions of recording and reproducing. As shown in FIGS. 1A and 1B, the thin film magnetic head has a laminated structure comprising an insulating layer 2 made of, for example, a non-magnetic insulating material such as aluminum oxide ($Al_2O_3$; hereinafter simply referred to as "alumina"), a reproducing head portion 100A which performs reproducing by using a magnetoresistive (MR) effect, a separating layer 7 made of, for example, a non-magnetic insulating material such as alumina, a single pole recording head 100B which performs recording by a perpendicular recording system and an overcoat layer 16 made of, for example, a non-magnetic insulating material such as alumina in this order on a substrate 1 made of a ceramic material such as AlTiC ($Al_2O_3.TiC$).

The reproducing head portion 100A comprises, for example, a bottom shield layer 3, a shield gap film 4 and a top shield layer 5, which are laminated in this order. An MR device 6 as a reproducing device is buried in the shield gap film 4 so that a surface of the MR device 6 can be exposed to a recording-medium-facing surface (air bearing surface) 30 to face a recording medium.

The bottom shield layer 3 and the top shield layer 5 are made of, for example, a magnetic material such as a nickel iron alloy (NiFe (for example, Ni: 80 wt %, Fe: 20 wt %); hereinafter simply referred to as "Permalloy (trade name)") with a thickness of approximately 1.0 μm to 2.0 μm. The shield gap film 4 is provided to electrically separate the MR device 6 from its surroundings, and is made of, for example, a non-magnetic insulating material such as alumina. The MR device 6 is provided to perform reproducing by using, for example, a giant magnetoresistive (GMR) effect, a tunneling magnetoresistive (TMR) effect or the like.

The recording head portion 100B comprises, for example, a pole layer 20 of which surroundings are buried in insulating layers 9 and 11, a gap layer 12 having an aperture for connection (a back gap 12BG), a thin film coil 13 for generating a magnetic flux which is buried in an insulating layer 14, and a return yoke layer 15 (a return pole layer), which are laminated in this order. In FIG. 2, only the pole layer 20, the thin film coil 13 and the return yoke layer 15 in the recording head portion 100B are shown.

The pole layer 20 contains a magnetic flux generated in the thin film coil 13 and emits the magnetic flux toward a recording medium. The pole layer 20 has, for example, a two-layer structure including a main pole layer 10 functioning as a main magnetic flux emission portion, and an auxiliary pole layer 8 functioning as an auxiliary magnetic flux containing portion for securing the magnetic volume (amount of the contained magnetic flux) of the main pole layer 10, which are laminated. The insulating layers 9 and 11 are made of, for example, a non-magnetic insulating material such as alumina.

The auxiliary pole layer 8 is disposed on a leading side (medium-incoming side) of the main pole layer 10 so as to extend from a position behind the air bearing surface 30 to a direction away from the position, and has a connection with the main pole layer 10. The auxiliary pole layer 8 is made of, for example, the same magnetic material as the main pole layer 10, and has a rectangular planar shape. In the invention, "connection" means not only just having a connection with something but also being capable of being magnetically connected to it. The meaning of the "leading side (medium-incoming side)" will be described in detail later when the structure of the return yoke layer 15 is described.

The main pole layer 10 extends from the air bearing surface 30 to a direction away from the air bearing surface 30, and includes a front end portion 10A (a first pole layer portion) having an uniform width W1 (μm) which determines a recording track width and extending from the air bearing surface 30, and a rear end portion 10B (a second pole layer portion) being connected to the rear of the front end portion 10A and having a width W2 larger than the width W1 of the front end portion 10A (W2>W1). The width W1 of the front end portion 10A is approximately 0.2 μm or less. The rear end portion 10B has, for example, a uniform width W2 in a rear portion and a width which gradually decreases closer to the front end portion 10A in a front portion. A position where the width of the main pole layer 10 expands from the front end portion 10A to the rear end portion 10B is a "flare point (widening position) FP" which is one of important factors in determining recording performance of the thin film magnetic head. A distance between the flare point FP and the air bearing surface 30 is called a "neck height NH (μm)", and the distance is approximately 0.3 μm or less. The main pole layer 10 is made of, for example, a magnetic material with a saturated magnetic flux density of 2.4 T (Tesla), more specifically an iron-cobalt alloy (FeCo) based or iron-cobalt-nickel alloy (FeCoNi) based magnetic material with a thickness of approximately 0.2 μm to 0.3 μm. Moreover, the main pole layer 10 has, for example, a rectangular exposed surface 10P (pole end surface) exposed to the air bearing surface 30.

The gap layer 12 produces a magnetic gap between the main pole layer 10 and the return yoke layer 15 in proximity to the air bearing surface 30. The gap layer 12 is made of, for example, a non-magnetic insulating material such as alumina with a thickness of approximately 0.2 μm or less.

The thin film coil 13 has, for example, a winding structure spirally wound around the back gap 12BG, and is made of a high conductive material such as copper (Cu). In FIGS. 1A, 1B and 2, only a part of a plurality of windings constituting the thin film coil 13 is shown.

The insulating layer 14 electrically separates the thin film coil 13 from its surroundings. The insulating layer 14 is made of, for example, a photoresist (photosensitive resin) exhibiting liquidity by heating, a spin-on glass (SOG) or the like. The insulating layer 14 has a rounded oblique surface. The forefront end position of the insulating layer 14 is a "throat height zero position TP" which is one of important factors in determining recording performance of the thin film magnetic head. A distance between the throat height zero position TP and the air bearing surface 30 is called a "throat height TH (μm)" which is approximately 0.3 μm or less. Moreover, an apex angle θ determined based upon an oblique angle of a front portion of the insulating layer 14 is approximately 40° to 60°.

The return yoke layer 15 returns the magnetic flux emitted from the pole layer 20 to magnetize the recording medium. The return yoke layer 15 is disposed on the trailing side (medium-outgoing side) of the pole layer 20 so as to face the pole layer 20 with the gap layer 12 in between on a side closer to the air bearing surface 30 and be connected to the pole layer 20 in the back gap 12BG on a side farther from the air bearing surface 30. The return yoke layer 15 has, for example, a continuous structure extending from the air bearing surface 30 to the back gap 12BG, and a rectangular planar shape. The return yoke layer 15 is made of a magnetic material such as Permalloy or an iron-cobalt-nickel alloy (FeCoNi). Moreover, the return yoke layer 15 has, for example, a rectangular exposed surface 15P (return pole end surface) exposed to the air bearing surface 30.

In comparison between the exposed surface 15P of the return yoke layer 15 and the exposed surface 10P of the main pole layer 10, the height (dimension in a thickness direction) T3 of the exposed surface 15P is 5 or more times larger than the height T1 of the exposed surface 10P (T3≧5×T1), and the width W3 of the exposed surface 15P is equal to or larger than the width W1 of the exposed surface 10P (W3≧W1). The width W1 of the exposed surface 10P which is compared to the width W3 of the exposed surface 15P is the width of an edge E of the exposed surface 10P on the trailing side, to be exact. In FIGS. 1A, 1B and 2, the case where the width W3 of the exposed surface 15P is larger than the width W1 of the exposed surface 10P (W3>W1) is shown.

When the movement of the recording medium toward a direction B of medium movement (refer to FIGS. 1A and 1B) is considered as a flow, the above-described "trailing side (medium-outgoing side)" means a side where the flow outgoes, and in this case, the trailing side is a top side in a thickness direction (Z-axis direction). On the other hand, the "leading side (medium-incoming side)" means a side where the flow incomes, and in this case, the leading side is a bottom side in a thickness direction.

In the thin film magnetic head, even in the case where the thickness of the gap layer 12 is approximately 0.2 µm or less to bring the return yoke layer 15 closer to the main pole layer 10, in order to secure the recording characteristics, a relationship between the width W1 of the front end portion 10A of the main pole layer 10, the throat height TH and the neck height NH is appropriately set. More specifically, the neck height NH is within a range of NH≦W1+0.05 µm, and a ratio between the neck height NH and the throat height TH (height ratio) NH/TH is within a range of 0.5<NH/TH<1.6.

Now, the relationship between the width W1 of the front end portion 10A and a recording track width WE (not shown) on the recording medium will be described below. In general, when a recording magnetic field is generated based upon a magnetic flux emitted from the front end portion 10A, and information is magnetically recorded on the recording medium by the recording magnetic field, the recording track width WE on the recording medium is larger than the width W1 of the front end portion 10A (WE>W1), because the magnetic flux expands in a width direction. When an offset between the width W1 and the recording track width WE is 0.1 µm, that is, a relationship of WE=W1+0.1 µm is established, as described above, the neck height NH is preferably within a range of NH W1≦0.05 µm. In addition, for example, when the offset is 0.05 µm, that is, a relationship of WE=W1+0.05 µm is established, the neck height NH is preferably within a range of NH≦W1+0.05 µm.

Next, referring FIGS. 1A, 1B and 2, actions of the thin film magnetic head will be described below.

In the thin film magnetic head, in recording information, when a current flows into the thin film coil 13 of the recording head 100B through an external circuit (not shown), a magnetic flux is generated in the thin film coil 13. After the magnetic flux generated at this time is contained in the auxiliary pole layer 8 and the main pole layer 10 constituting the pole layer 20, the magnetic flux mainly flows from the rear end portion 10B to the front end portion 10A in the main pole layer 10. At this time, the magnetic flux flowing through the main pole layer 10 is concentrated at the flare point FP according to a decrease in the width of the main pole layer 10 (W2 to W1), so the magnetic flux is focused on a portion of the front end portion 10A on the trailing side. When the magnetic flux is emitted from the front end portion 10A to outside, a recording magnetic field is generated in a direction perpendicular to a surface of the recording medium, and the recording medium is magnetized in a perpendicular direction by the recording magnetic field, so information is magnetically recorded on the recording medium. The magnetic flux magnetizing the recording medium is returned to the return yoke layer 15.

On the other hand, in reproducing, when a sense current flows into the MR device 6 of the reproducing head 100A, the resistance of the MR device 6 is changed depending upon a signal magnetic field for reproducing from the recording medium. A change in the resistance is detected as a change in the sense current so that the information recorded on the recording medium is magnetically read out.

Next, referring to FIGS. 4A and 4B through 7A and 7B, a method of manufacturing the thin film magnetic head shown in FIGS. 1A and 1B through 3 will be described below. FIGS. 4A and 4B through 7A and 7B show sectional views for describing each step in the method of manufacturing the thin film magnetic head corresponding to FIGS. 1A and 1B.

At first, the method of manufacturing the thin film magnetic head will be briefly described below, and then a method of forming a main part (that is, the recording head portion 100B) of the thin film magnetic head will be described in detail below. The materials, forming positions and structural characteristics of components of the thin magnetic head will not be further described, because they have been already described above.

The thin film magnetic head is manufactured through laminating each component in order mainly by use of existing thin film processes including film formation techniques such as plating and sputtering, patterning techniques such as photolithography, etching techniques such as dry etching and so on. More specifically, at first, after the insulating layer 2 is formed on the substrate 1, the bottom shield layer 3, the shield gap film 4 burying the MR device 6, and the top shield layer 5 are laminated in this order on the insulating layer 2 so as to form the reproducing head 100A. Next, after the separating layer 7 is formed on the reproducing head 100A, on the separating layer 7, the pole layer 20 (the auxiliary pole layer 8 and the main pole layer 10) of which surroundings are buried by the insulating layers 9 and 11, the gap layer 12 including the back gap 12BG, the insulating layer 14 burying the thin film coil 13, and the return yoke layer 15 are laminated in this order so as to form the recording head 100B. Finally, after the overcoat layer 16 is formed on the recording head portion 100B, the air bearing surface 30 is formed through machining or polishing to complete the thin film magnetic head.

Figures 4A, 4B:
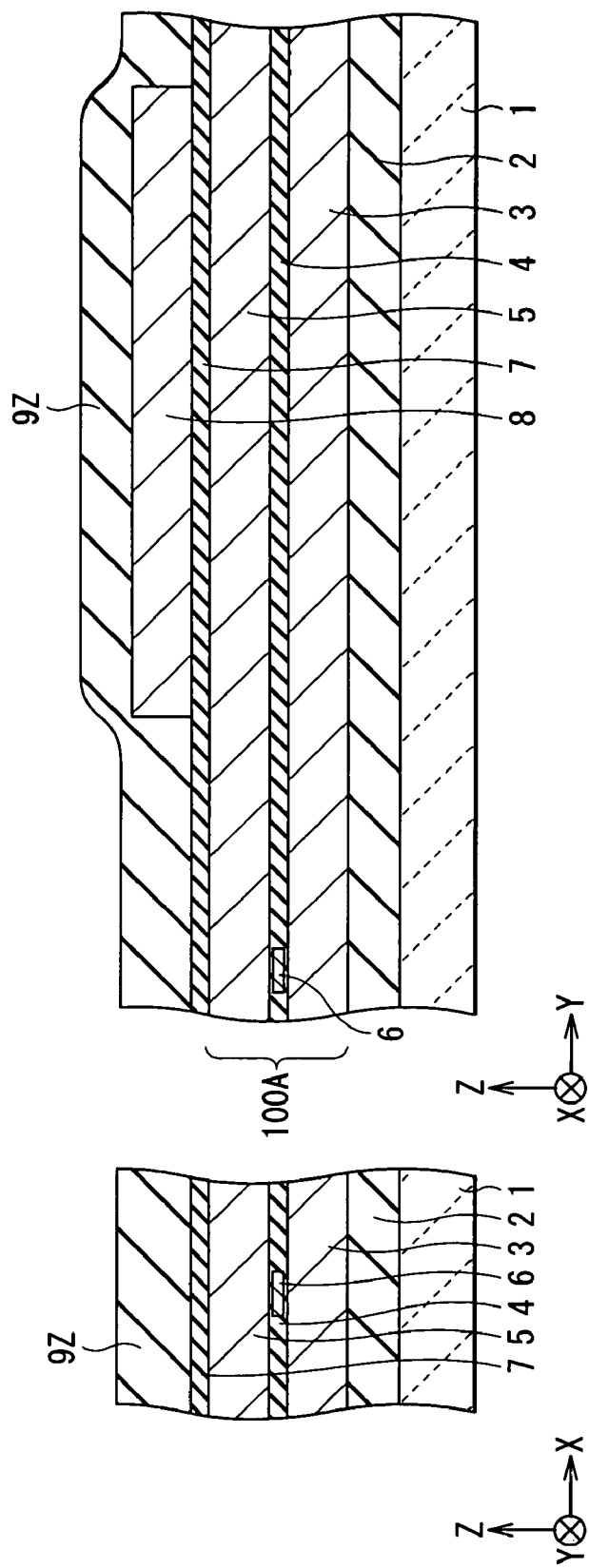
FIGS. 4A and 4B are sectional views for describing one step in a method of manufacturing the thin film magnetic head shown in FIGS. 1A and 1B through 3.

When the recording head portion 100B is formed, after forming the separating layer 7, at first, as shown in FIGS. 4A and 4B, the auxiliary pole layer 8 is selectively formed on the separating layer 7 through, for example, plating so as to be disposed behind a position (refer to FIGS. 1A and 1B) where the air bearing surface 30 is formed in a later process. Then, a precursor insulating layer 9Z made of alumina is formed through, for example, sputtering so as to be laid over the auxiliary pole layer 8 and the separating layer 7.

Next, the precursor insulating layer 9Z is polished through, for example, CMP (chemical mechanical polishing) until at least the auxiliary pole layer 8 is exposed so as to be flat, thereby, as shown in FIGS. 5A and 5B, the insulating layer 9 is formed so as to bury the surroundings of the auxiliary pole layer 8. Then, after a magnetic layer (not shown) made of an iron-cobalt alloy (FeCo) based or an iron-cobalt-nickel alloy (FeCoNi) based magnetic material is formed on a flat surface including the auxiliary pole layer 8 and the insulating layer 9 through, for example, plating or sputtering, the magnetic layer is patterned through photolithography or etching to selectively form the main pole layer 10. When the main pole layer 10 is formed, the main pole layer 10 includes the front end portion 10A and the rear end portion 10B in order from the front, and the forming position is adjusted so that the neck height NH finally becomes approximately 0.3 µm or less. Thereby, the pole layer 20 with a two-layer structure including the auxiliary pole layer 8 and the main pole layer 10 is formed. Next, a precursor insulating layer 11Z made of alumina is formed through, for example, sputtering so as to be laid over the main pole layer 10 and the insulating layer 9.

Figures 6A, 6B:
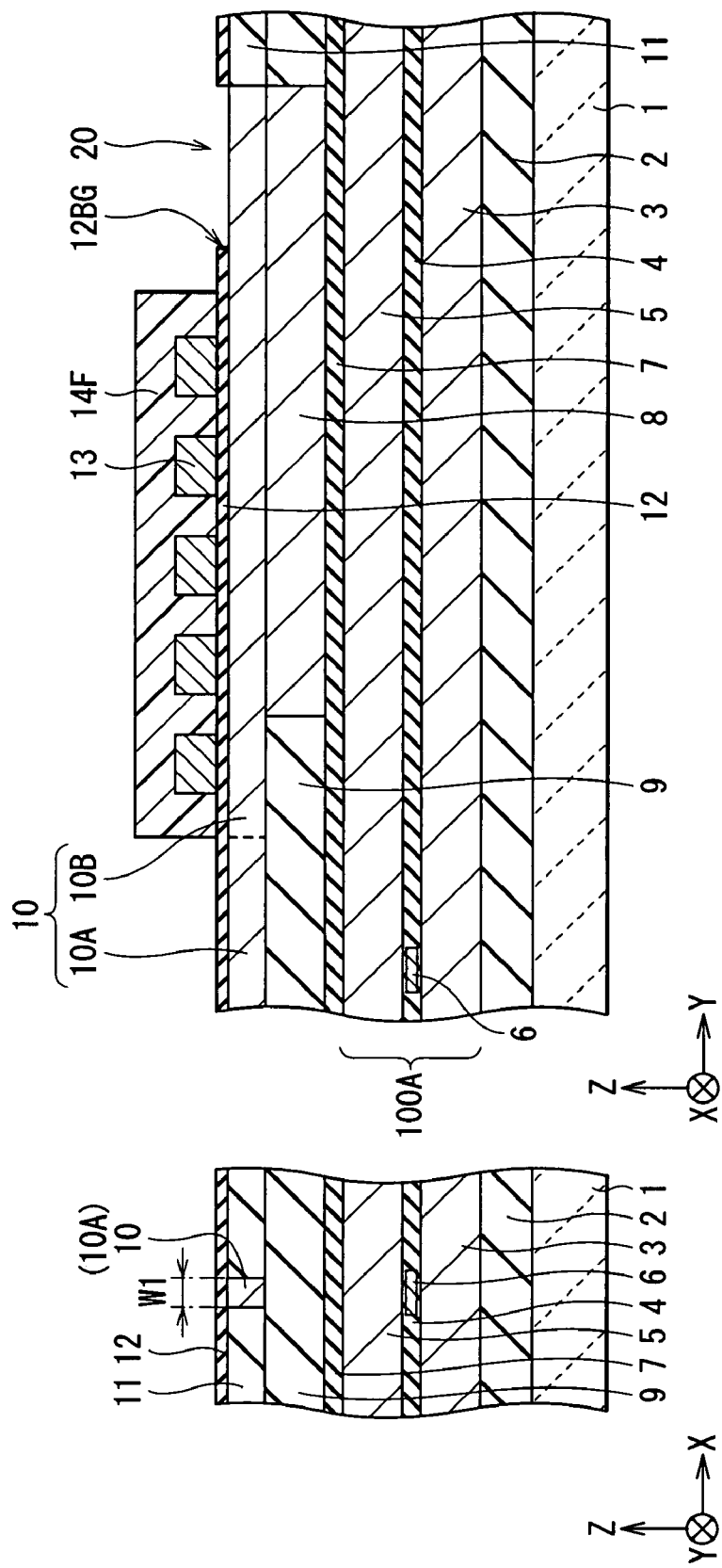
FIGS. 6A and 6B are sectional views for describing a step following the step of FIGS. 5A and 5B.

Next, the precursor insulating layer 11Z is polished through, for example, CMP until at least the main pole layer 10 is exposed so as to be flat, thereby, as shown in FIGS. 6A and 6B, the insulating layer 11 is formed so as to bury the surroundings of the main pole layer 10. By the polishing process at this time, the edge E of the front end portion 10A on the trailing side (refer to FIG. 3) is determined. Then, on the flat surface including the main pole layer 10 and the insulating layer 11, the gap layer 12 is formed through, for example, sputtering so as to have a thickness of approximately 0.2 μm or less. The gap layer 12 is formed so as not to be laid over the back gap 12BG. Next, on the gap layer 12, the thin film coil 13 is selectively formed through, for example, plating. Then, a photoresist film 14F is selectively formed through, for example, photolithography so that gaps between windings of the thin film coil 13 and their surroundings are covered with the photoresist film 14F.

Figures 7A, 7B:
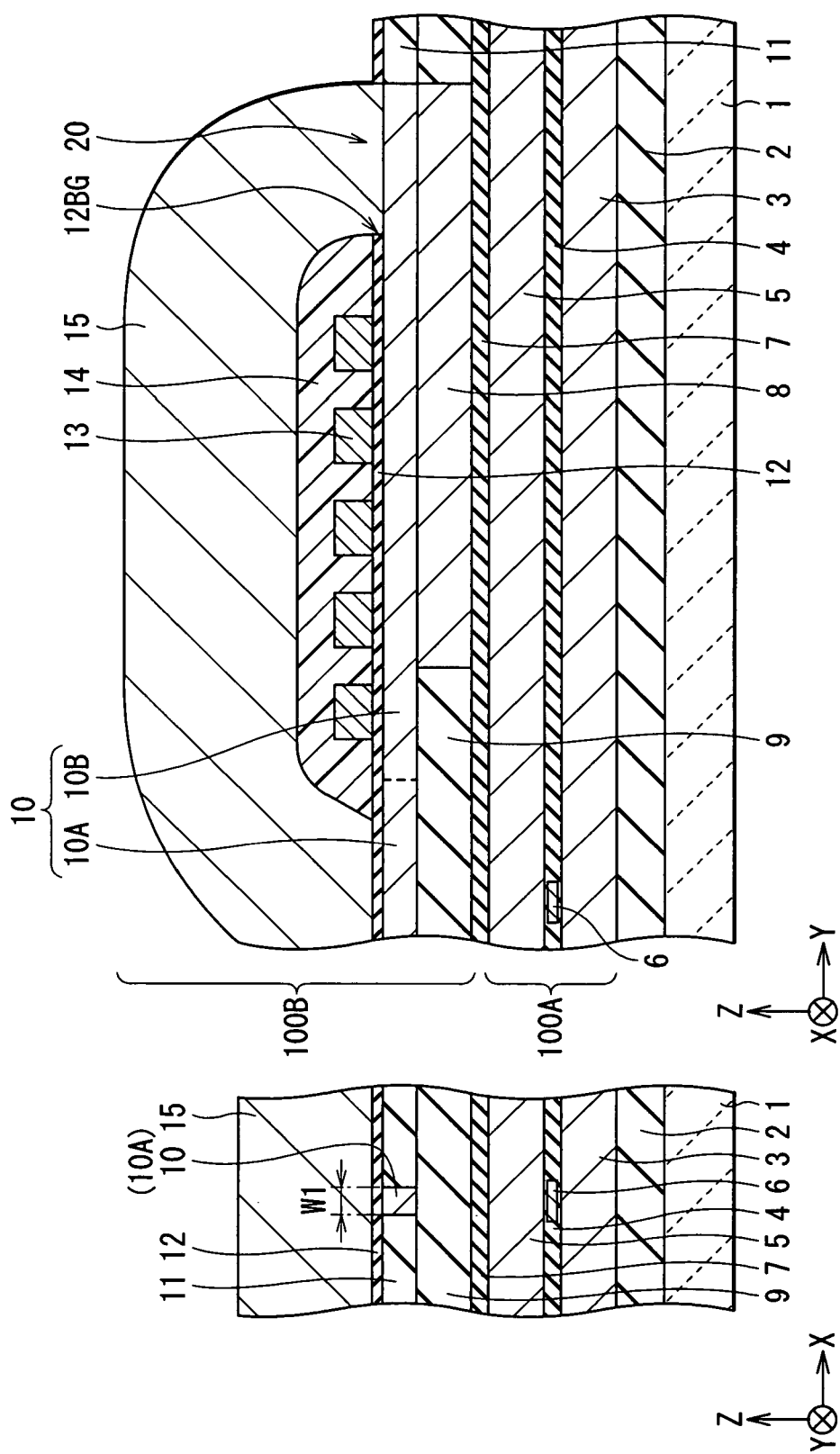
FIGS. 7A and 7B are sectional views for describing a step following the step of FIGS. 6A and 6B.

Next, the photoresist film 14F is fired so as to form the insulating layer 14 as shown in FIGS. 7A and 7B. The photoresist film 14F flows by firing, so the insulating layer 14 is formed so as to have a rounded oblique surface. When the insulating layer 14 is formed, the forming position is adjusted so that the throat height TH finally becomes approximately 0.3 μm or less. Finally, the return yoke layer 15 made of Permalloy or an iron-cobalt-nickel alloy (Fe-CoNi) is selectively formed through, for example, plating or sputtering so as to be laid over the insulating layer 14 and its surroundings. The return yoke layer 15 is formed so as to face the pole layer 20 with the gap layer 12 in between on a front side and to be connected to the pole layer 20 through the back gap 12BG on a rear side. Specifically, as shown in FIG. 3, finally, the height T3 of the exposed surface 15P becomes 5 or more times larger than the height T1 of the exposed surface 10P, and the width W3 of the exposed surface 15P is equal to or larger than the width W1 of the exposed surface 10P. Thereby, the recording head portion 100B is completed.

In the thin film magnetic head according to the embodiment, the return yoke layer 15 is disposed on the trailing side of the pole layer 20, and the neck height NH is within a range of NH≦W1+0.05 μm, and the height ratio NH/TH is within a range of 0.5<NH/TH<1.6, so when the thickness of the gap layer 12 is approximately 0.2 μm or less to bring the return yoke layer 15 closer to the pole layer 20, the neck height NH and the height ratio NH/TH which have an influence on the recording characteristics can become appropriate. Therefore, in the embodiment, unlike a conventional thin film magnetic head in which the neck height NH and the height ratio NH/TH is not appropriate, the recording characteristics such as the overwrite characteristics and the SN ratio can be secured. More specifically, the overwrite characteristics of approximately 30 dB or over and a SN ratio of higher than approximately 18 dB can be obtained.

Moreover, in the embodiment, the height T3 of the exposed surface 15P of the return yoke layer 15 is 5 or more times larger than the height T1 of the exposed surface 10P of the main pole layer 10, and the width W3 of the exposed surface 15P is equal to or larger than the width W1 of the exposed surface 10P, so the area of the exposed surface 15P is larger than that of the exposed surface 10P, thereby unintended writing by the return yoke layer 15 can be prevented. It is because when the area of the exposed surface 15P is equal to or smaller than the area of the exposed surface 10P, a return opening (that is, the exposed surface 15P) for returning the magnetic flux already recorded is narrower, so the magnetic flux is concentrated on a portion in proximity to the exposed surface 15P, thereby unintended writing by the return yoke layer 15 which is originally not a portion of executing writing is easily carried out, but when the area of the exposed surface 15P is larger than that of the exposed surface 10P, the magnetic flux already recorded is smoothly returned to the return yoke layer 15 through a sufficiently wide return opening, so the magnetic flux is less easily concentrated on a portion in the proximity to the exposed surface 15P, thereby unintended wiring by the return yoke layer 15 can be prevented.

Moreover, in the embodiment, the pole layer 20 has a two-layer structure in which the auxiliary pole layer 8 behind the air bearing surface 30 and the main pole layer 10 exposed to the air bearing surface 30 are laminated, so while the size of a magnetic flux emission opening is reduced, the magnetic volume (amount of the contained magnetic flux) can be secured. Therefore, the recording magnetic field strength can be improved.

[Second Embodiment]

Next, a second embodiment of the invention will be described below.

Figures 8A, 8B:
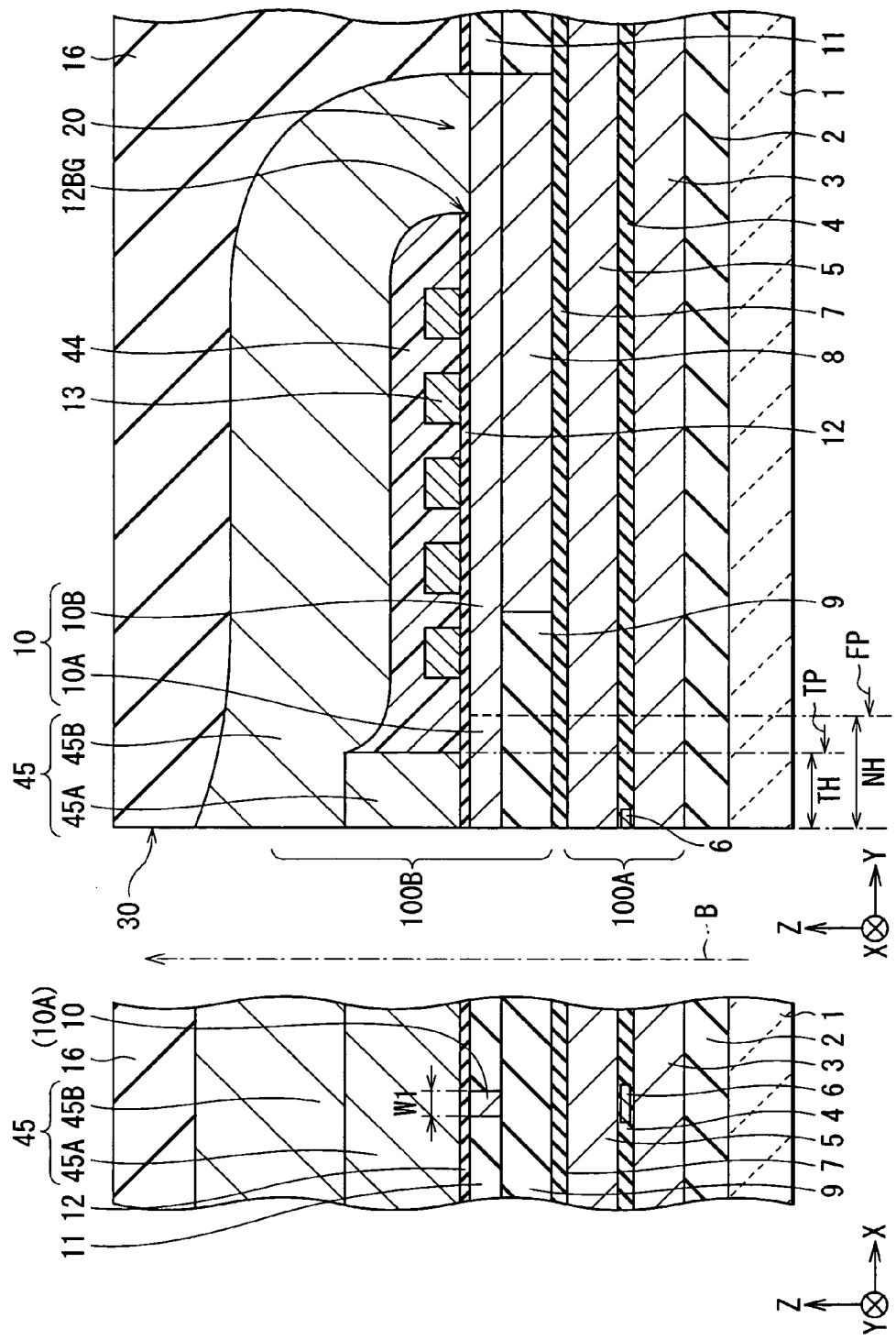
FIGS. 8A and 8B are sectional views of a thin film magnetic head according to a second embodiment of the invention.
Figure 9:
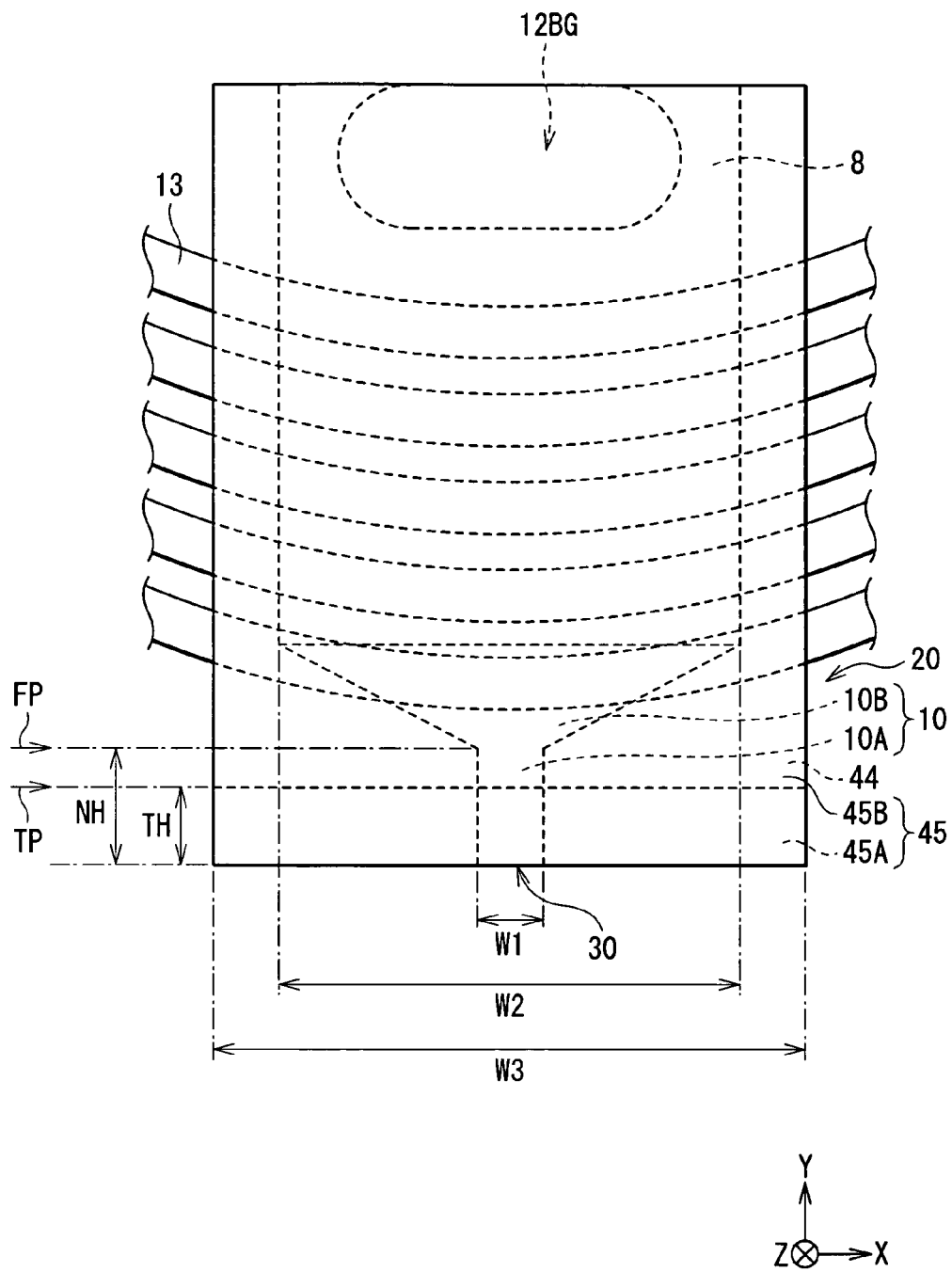
FIG. 9 is a plan view of a main part of the thin film magnetic head shown in FIGS. 8A and 8B.

At first, referring to FIGS. 8A and 8B through 10, the structure of a thin film magnetic head according to the second embodiment of the invention will be described below. FIGS. 8A and 8B show sectional views of the thin film magnetic head, and FIG. 8A is a sectional view parallel to the air bearing surface 30 and FIG. 8B is a sectional view perpendicular to the air bearing surface 30. FIG. 9 is a plan view of a main part of the thin film magnetic head shown in FIGS. 8A and 8B, and FIG .10 shows an enlarged plan view of an exposed surface of the main part. In FIGS. 8A and 8B through 10, like components are denoted by like numerals as of the first embodiment.

Figure 10:
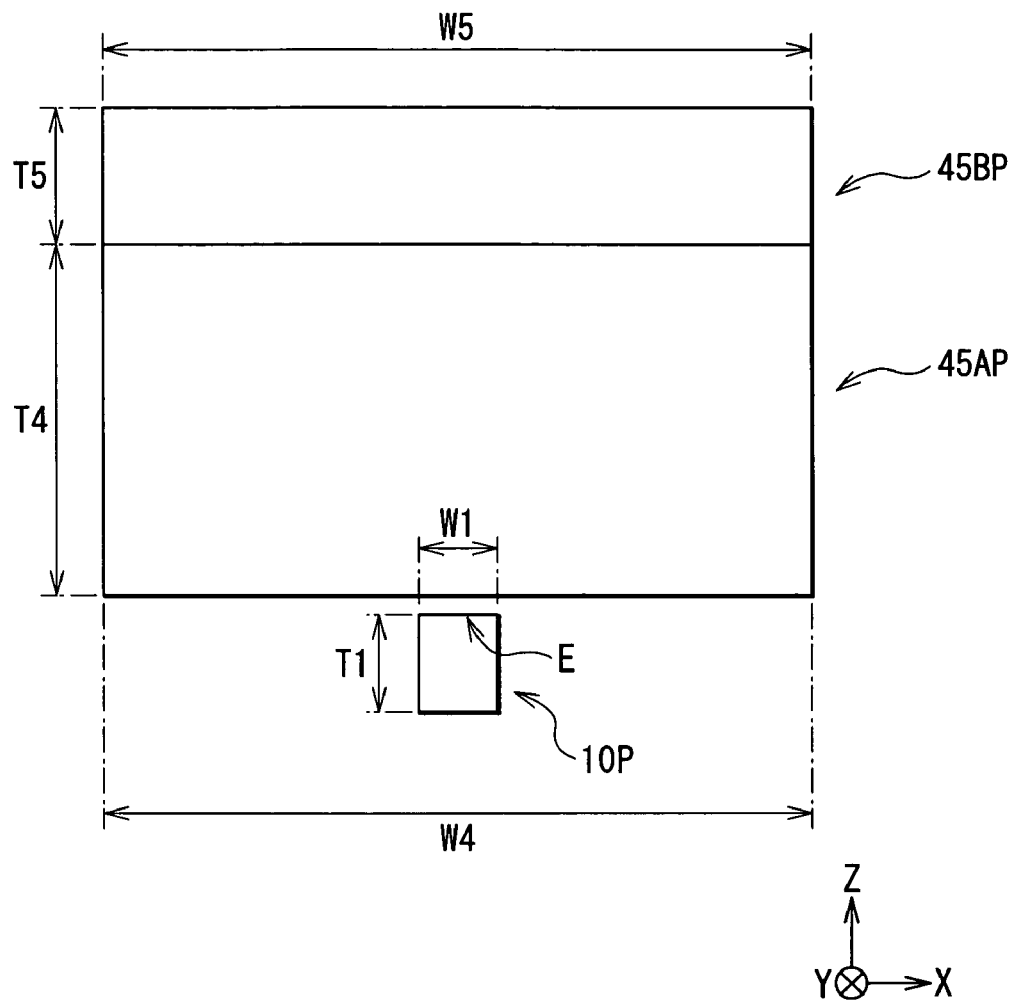
FIG. 10 is an enlarged plan view of an exposed surface of the main part of the thin film magnetic head shown in FIG. 9.

The thin film magnetic head has the same structure as that according to the first embodiment, except that unlike the first embodiment in which the return yoke layer 15 with a continuous structure is included, a return yoke layer 45 with a composite structure including two portions (a TH determining portion 45A and a yoke portion 45B) connected to each other is included, and the forefront end position of an insulating layer 44 (that is, the throat height zero position TP) is determined based upon the rear end position of the TH determining portion 45A. As described above, the return yoke layer 45 includes the TH determining portion 45A (a first return pole layer portion) extending from the air bearing surface 30 to the forefront end position of an insulating layer 44, and the yoke portion 45B (a second return pole layer portion) extending from the air bearing surface 30 to the back gap 12BG, and being connected to the TH determining portion 45A and the pole layer 20. The TH determining portion 45A and the yoke portion 45B have, for example, a rectangular planar shape. The return yoke layer 45 has, for example, an exposed surface 45AP with a rectangular shape of the TH determining portion 45A and an exposed surface 45BP with a rectangular shape of the yoke portion 45B, as shown in FIG. 10. A front portion of the insulating layer 44 is adjacent to a rear end surface of the TH determining portion 45A, unlike the first embodiment in which the insulating layer 14 has a rounded oblique surface. In this case, the apex angle θ is approximately 90°.

In the thin film magnetic head, as in the case of the first embodiment, the neck height NH, the height ratio NH/TH and the dimensions of the exposed surfaces 45AP and 45BP become appropriate. More specifically, the neck height NH is within a range of NH≦W1+0.05 μm, and the height ratio NH/TH is within a range of 0.5<NH/TH<1.6. Moreover, as shown in FIG. 10, in comparison between the exposed surface of the return yoke layer 45 (that is, the exposed surface 45AP of the TH determining portion 45A and the exposed surface 45BP of the yoke portion 45B) and the exposed surface 10P of the main pole layer 10, the total height (T4+T5) of the height T4 of the exposed surface 45AP and the height T5 of the exposed surface 45BP is 5 or more times larger than the height T1 of the exposed surface 10P ((T4+T5)≧5×T1), and both of the width W4 of the exposed surface 45AP and the width W5 of the exposed surface 45BP are equal to or larger than the width W1 of the exposed surface 10P (W4, W5≦W1).

Next, referring to FIG. 11A, 11B, 12A and 12B, a method of manufacturing the thin film magnetic head shown in FIGS. 8A through 10 will be described below. FIGS. 11A, 11B, 12A and 12B show sectional views for describing each step in the method of manufacturing the thin film magnetic head corresponding to FIGS. 8A and 8B. In the following description, only a method of manufacturing a main part of the recording head portion 100B will be described.

Figure 11:
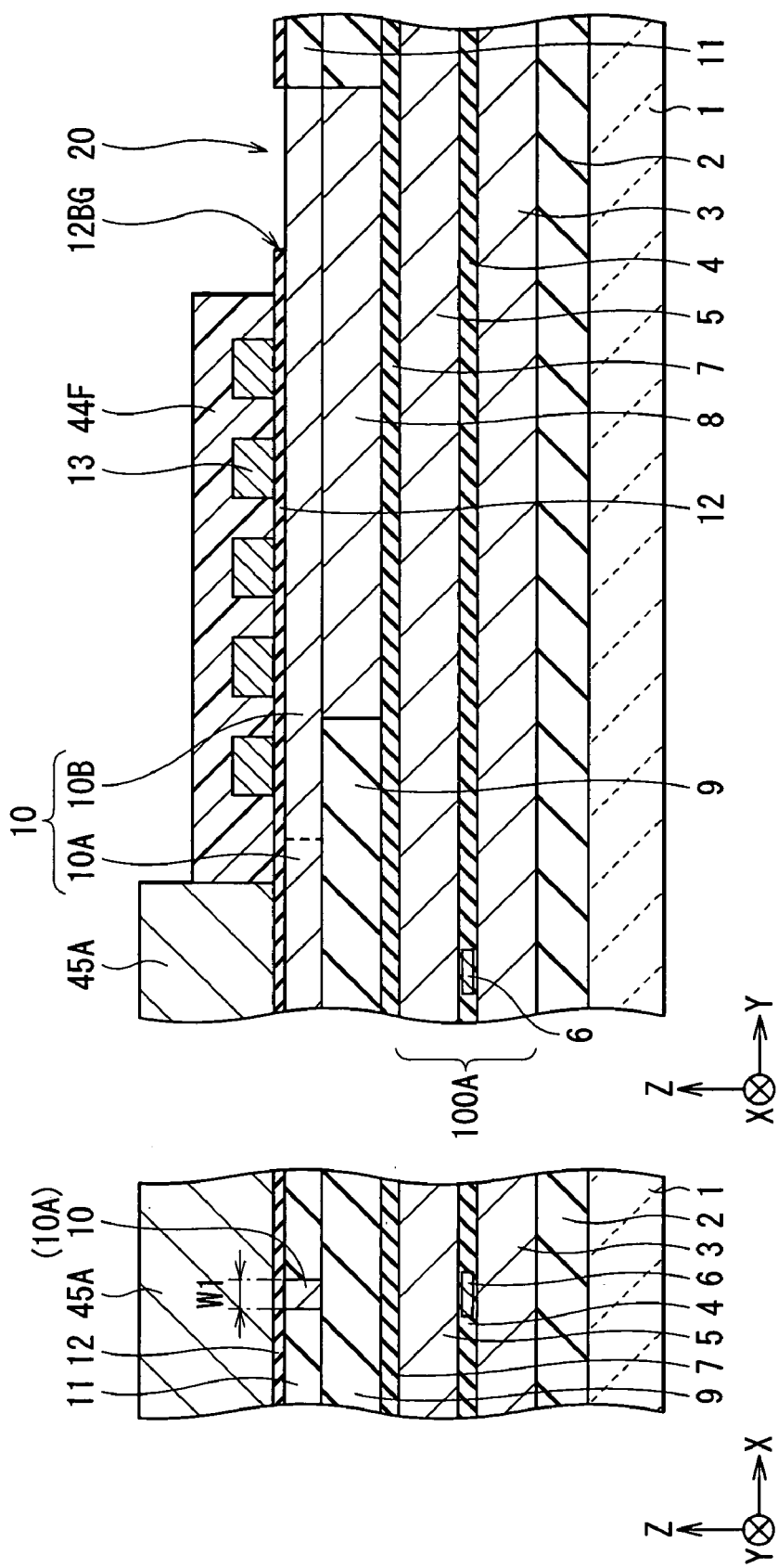
FIGS. 11A and 11B are sectional views for describing one step of a method of manufacturing the thin film magnetic head shown in FIGS. 8A and 8B through 10.

When the main part of the recording head portion 100B is formed, after the gap layer 12 is formed through the steps shown in FIGS. 4A and 4B through 6A and 6B in the first embodiment, at first, as shown in FIGS. 11A and 11B, the TH determining portion 45A is selectively formed through, for example, plating in a region of the gap layer 12 in front of a region where the thin film coil 13 is formed in a later process. When the TH determining portion 45A is formed, the forming position is adjusted considering that the rear end position of the TH determining portion 45A determines the throat height zero position TP. Next, after the thin film coil 13 is selectively formed on the gap layer 12 between the TH determining portion 45A and the back gap 12BG, a photoresist film 44F is selectively formed through, for example, photolithography so that gaps between windings of the thin film coil 13 and their surroundings are covered with the photoresist film 44F. For example, the photoresist film 44F is formed so that a front portion thereof is adjacent to the rear end surface of the TH determining portion 45A. In the above description, the thin film coil 13 is formed after forming the TH determining portion 45A, but it is not necessarily limited to this. After forming the thin film coil 13, the TH determining portion 45A may be formed.

Figure 12:
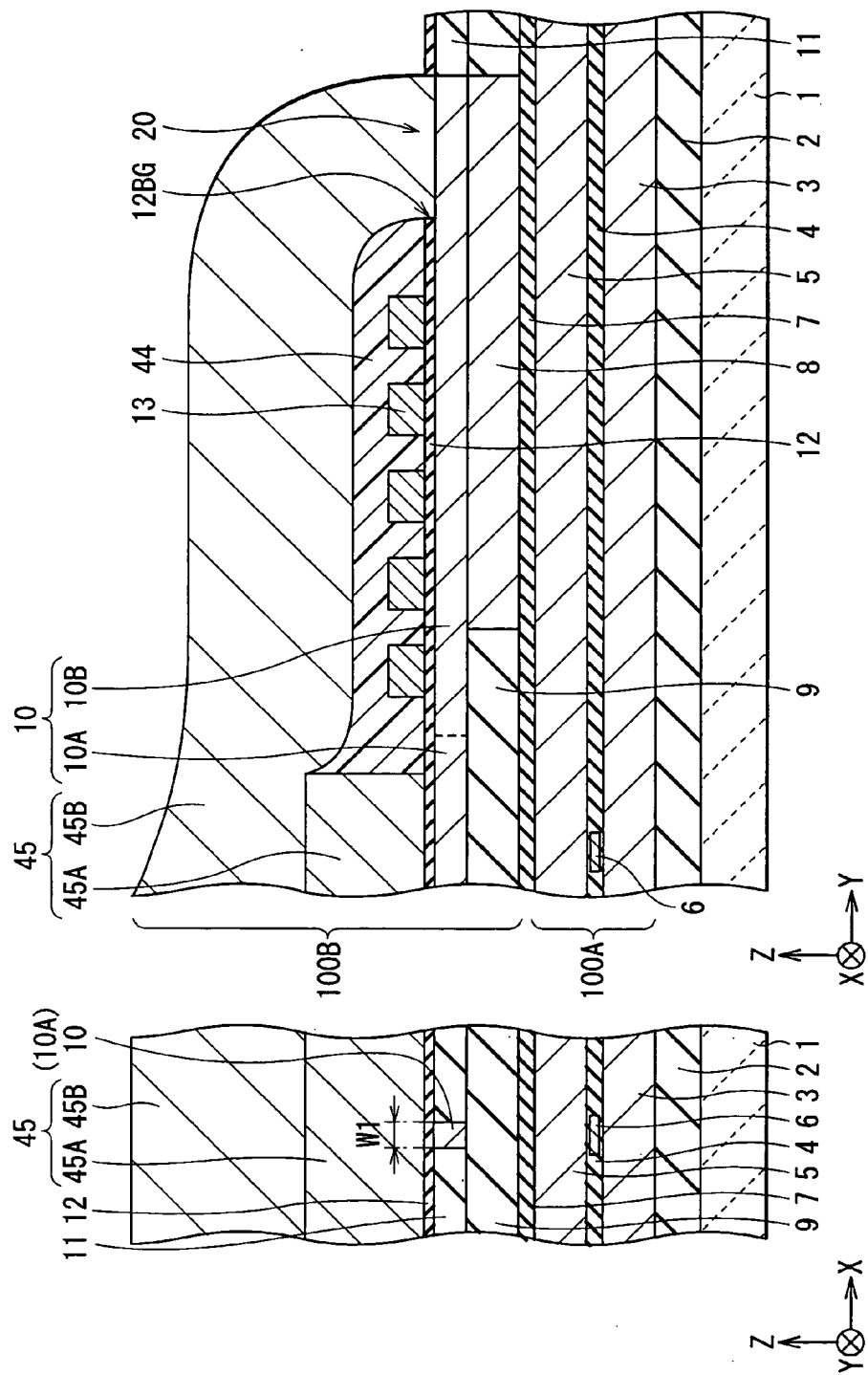
FIGS. 12A and 12B are sectional views for describing a step following the step of FIGS. 11A and 11B.

Next, as shown in FIGS. 12A and 12B, the photoresist film 44F is fired to form the insulating layer 44. The photoresist film 44F flows by firing, so the insulating layer 44 is formed so as to have a rounded oblique surface while the front portion of the insulating layer 44 is adjacent to the rear end surface of the TH determining portion 45A. Finally, the yoke portion 45B is selectively formed through, for example, plating so that the insulating layer 44 and its surroundings are covered with the yoke portion 45B. The yoke portion 45B is formed so that a front portion thereof can be formed on the TH determining portion 45A so as to be connected to the TH determining portion 45A and a rear portion thereof can be connected to the pole layer 20 through the back gap 12BG. More specifically, as shown in FIG. 10, finally, the total height of the height T4 of the exposed surface 45AP and the height T5 of the exposed surface 45BP is 5 or more times larger than the height T1 of the exposed surface 10P, and the width W4 of the exposed surface 45AP and the width W5 of the exposed surface 45B are equal to or larger than the width W1 of the exposed surface 10P. Thereby, the return yoke layer 45 with a composite structure including the TH determining portion 45A and the yoke portion 45B connected to each other is formed, and the recording head portion 100B is completed.

In the thin film magnetic head according to the embodiment, the return yoke layer 45 having a composite structure including the TH determining portion 45A and the yoke portion 45B is included on the trailing side of the pole layer 20, and the neck height NH is within a range of NH≦W1+ 0.05 μm, and the height ratio NH/TH is within a range of 0.5<NH/TH<1.6, so the recording characteristics can be secured because of the same functions as those in the first embodiment.

Specifically, in the embodiment, the insulating layer 44 is adjacent to the rear end surface of the TH determining portion 45A in the return yoke layer 45, so the forefront end position of the insulating layer 44, that is, the throat height zero position TP is determined based upon the position of the rear end surface of the TH determining portion 45A. Therefore, the throat height TH can be controlled more precisely than in the first embodiment, and fluctuation of the recording characteristics can be prevented. In other words, in the first embodiment in which the throat height zero position TP is determined based upon the forming position of the insulating layer 14 after firing without using the TH determining portion 45A, for example, when the photoresist film 14F excessively flows due to deviations from firing conditions or the like, the forefront end position of the insulating layer 14 is shifted frontward from a determined position, so as a result, the throat height TH may become shorter than a designed value. On the other hand, in the second embodiment in which the forefront end position of the insulating layer 44 is determined by using the TH determining portion 45A, as long as the insulating layer 44 is adjacent to the TH determining portion 45A, the throat height zero position TP is always determined in the position of the rear end surface of the TH determining portion 45A, so as result, the throat height TH can be precisely controlled. Therefore, fluctuation of the recording characteristics based upon the throat height TH can be prevented.

The structure, actions, functions and effects of the thin film magnetic head according to the second embodiment are equivalent to those in the first embodiment, and will not be further described.

The descriptions of thin film magnetic heads according to the first and the second embodiments are concluded.

Figure 13:
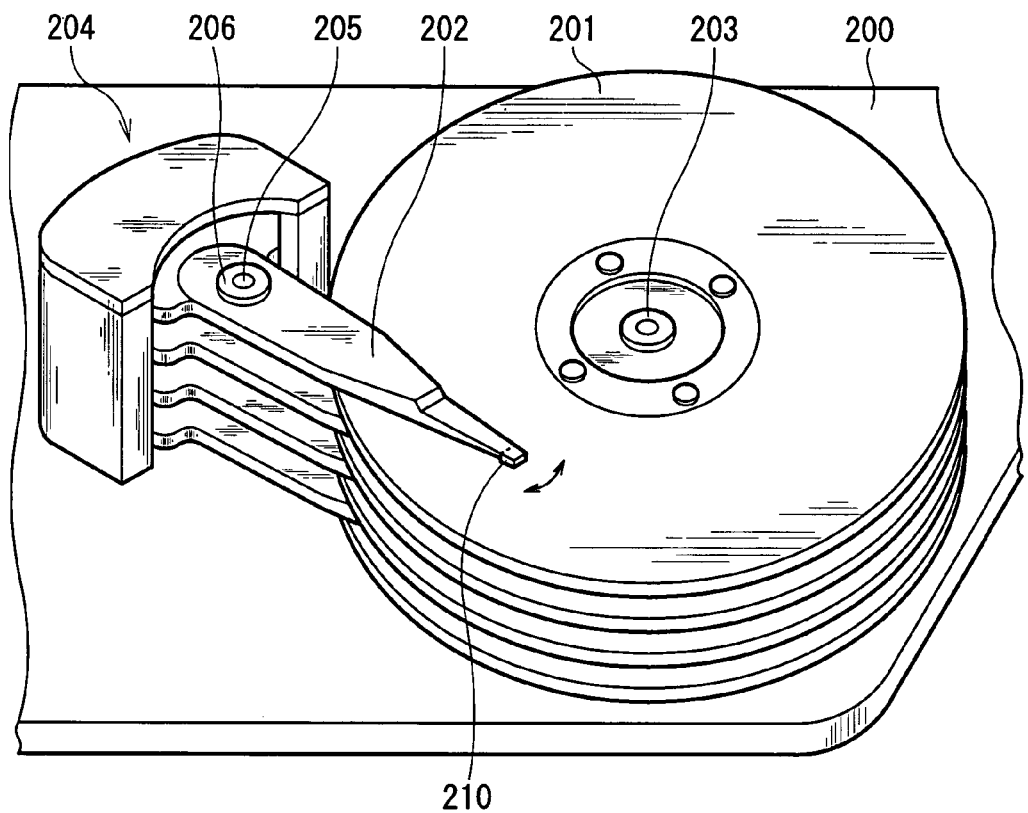
FIG. 13 is a cutaway outline view of a magnetic recording apparatus comprising the thin film magnetic head according to the invention.
Figure 14:
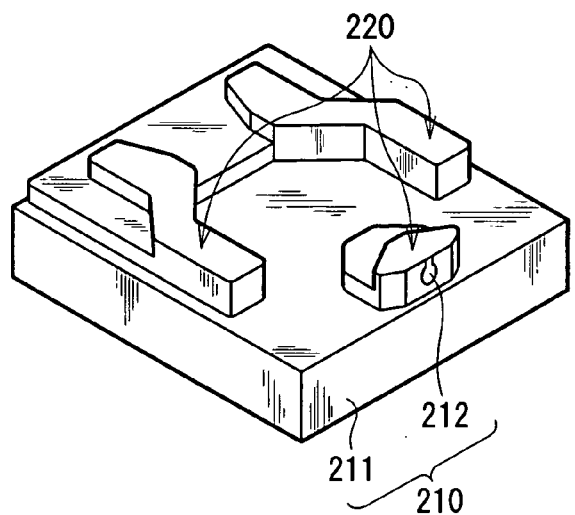
FIG. 14 is an enlarged outline view of a main part of the magnetic recording apparatus shown in FIG. 13.

Next, referring to FIGS. 13 and 14, the structure of a magnetic recording apparatus comprising the thin film magnetic head according to the invention will be described below. FIG. 13 shows a cutaway outline view of the magnetic recording apparatus, and FIG. 14 shows an enlarged outline view of a main part (head slider) of the magnetic recording apparatus. The magnetic recording apparatus comprises the thin film magnetic head according to the first or the second embodiment. The magnetic recording apparatus is, for example, a hard disk drive.

As shown in FIG. 13, the magnetic recording apparatus comprises a plurality of magnetic disks 201 as recording media on which information is recorded, and a plurality of arms 202 each of which is disposed so as to correspond to each magnetic disk 201 and has a head slider 210 on an end of the arm 202 in an enclosure 200. The magnetic disks 201 are rotatable about a spindle motor 203 fixed on the enclosure 200 as a center. The arms 202 are connected to a driving portion 204 as a power source, and are pivotable about a fixed shaft 205 fixed on the enclosure 200 as a center through a bearing 206. FIG. 13 shows, for example, a model in which the plurality of arms 202 integrally pivot about the fixed shaft 205 as a center.

As shown in FIG. 14, the head slider 210 has a structure in which a perpendicular recording system thin film magnetic head 212 is disposed on a side surface perpendicular to an air bearing surface 220 (a surface on a front side in FIG. 14) of a substantially-rectangular-shaped substrate 211 having an uneven structure so as to reduce air resistance while the arms 202 pivot. The thin film magnetic head 212 has, for example, the structure described in the first and the second embodiments. In order to easily show a structure of the head slider 210 viewed from a side closer to the air bearing surface 220, FIG. 14 shows the head slider 210 turned upside down from a state of FIG. 13.

The structure of the thin film magnetic head 212 has already been described in detail in the first and the second embodiments, and will not be further described.

In the magnetic recording apparatus, the arm 202 pivots during recording information so that the head slider 210 moves to a predetermined region (recording region) of the magnetic disk 201. Then, when the thin film magnetic head 212 is electrically conducted in a state of facing the magnetic disk 201, the thin film magnetic head 212 acts as described in the first and the second embodiments so as to record the information on the magnetic disk 201.

In the magnetic recording apparatus, as the thin film magnetic head 212 according to the invention is comprised, as described in the first and the second embodiments, when the neck height NH and the height ratio NH/TH of the thin film magnetic head 212 become appropriate, the recording characteristics can be secured.

Functions, effects, modifications and the like regarding the magnetic recording apparatus are equivalent to those in the first and the second embodiments, except for those described above.

EXAMPLES

Next, examples of the invention will be described below. When various characteristics of the thin film magnetic head shown in FIGS. 1A and 1B through 3 in the first embodiment (hereinafter simply referred to as "thin film magnetic head of the invention") were checked, the followings were confirmed.

Figure 15:
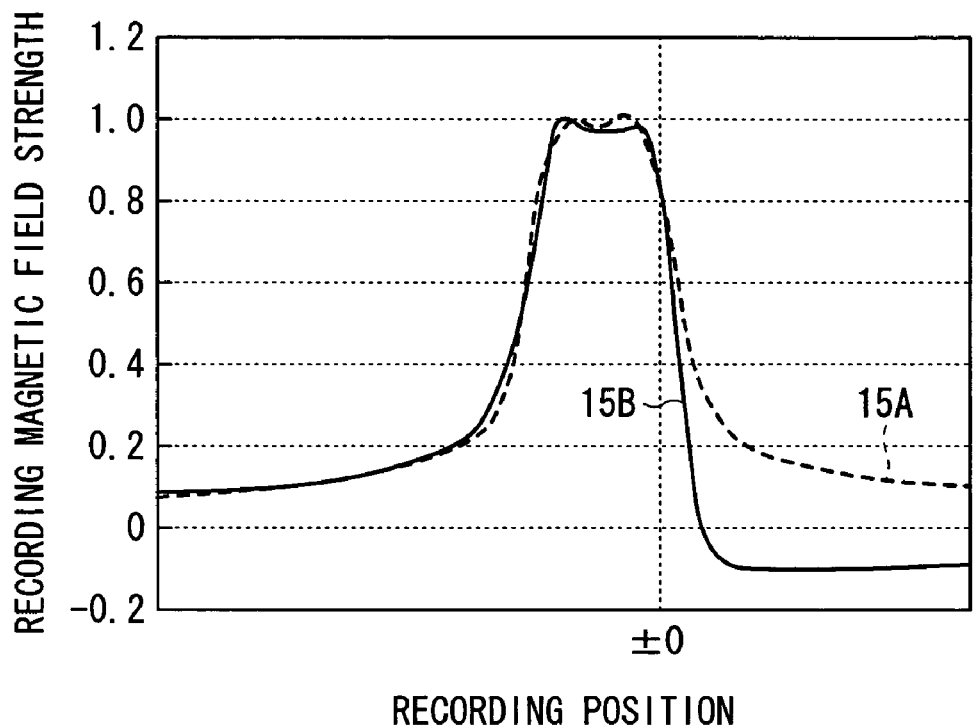
FIG. 15 is a plot showing dependence of recording magnetic field strength on a recording position.

At first, when the gradient of a recording magnetic field of the thin film magnetic head was checked, the result shown in FIG. 15 was obtained. FIG. 15 shows dependence of recording magnetic field strength on a recording position. In FIG. 15, a "lateral axis" indicates a recording position on the same track disposed on a recording medium and a "vertical axis" indicates recording magnetic field strength standardized for comparison ($10^3(4\pi)$A/m(=Oe)). A "±0" position of the lateral axis corresponds to the position of the edge E of the front end portion 10A on the trailing side (refer to FIG. 3), and the right side in FIG. 15 indicates the trailing side, and the left side in FIG. 15 indicates the leading side. In FIG. 15, "15A (by a broken line)" indicates a thin film magnetic head of a comparative example having the same structure as the thin film magnetic head of the invention, except that the return yoke layer 15 is not included, and "15B (by a solid line)" indicates the thin film magnetic head of the invention.

It was obvious from FIG. 15 that the recording magnetic field strength reached a peak around the position (±0) of the edge E of the front end portion 10A on the trailing side, and then decreased with distance from the position. In comparison between the thin film magnetic head (15B) of the invention and the thin film magnetic head (15A) of the comparative example, the recording magnetic field strength on the trailing side in the invention was reduced more than in the comparative example, that is, the gradient of the recording magnetic field in the invention increased more than in the comparative example. Therefore, it was confirmed that when the return yoke layer 15 was disposed on the trailing side of the pole layer 20, the recording magnetic field strength in proximity to the main pole layer 10 relatively improved in the air bearing surface 30.

Figure 16:
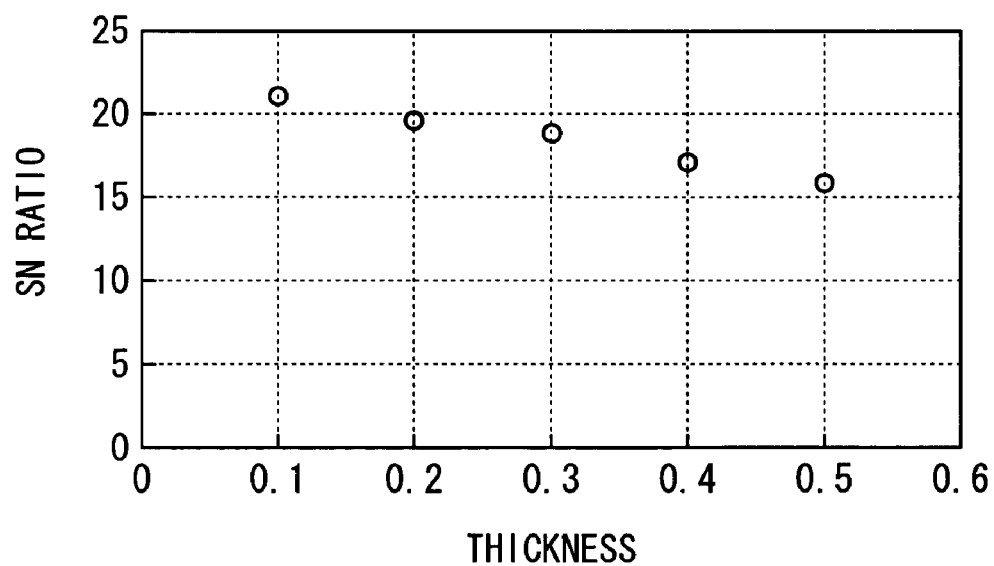
FIG. 16 is a plot showing dependence of a SN ratio on a gap thickness.

Next, when the SN ratio of the thin film magnetic head of the invention was checked, the result shown in FIG. 16 was obtained. FIG. 16 shows dependence of the SN ratio on a gap thickness. In FIG. 15, a "lateral axis" indicates the thickness (µm) of the gap layer 12, that is, a space between the main pole layer 10 and the return yoke layer 15, and a "vertical axis" indicates the SN ratio (dB).

It was obvious from FIG. 16 that the SN ratio increased with a decrease in the thickness of the gap layer 12. Therefore, it was confirmed that when the return yoke layer 15 was disposed on the trailing side of the pole layer 20, a higher SN ratio could be obtained, and specifically when the thickness of the gap layer 12 was reduced to bring the return yoke layer 15 closer to the main pole layer 10, the SN ratio was further improved. More specifically, when the thickness of the gap layer 12 was 0.2 µm or less, an extremely high SN ratio was obtained.

Figure 17:
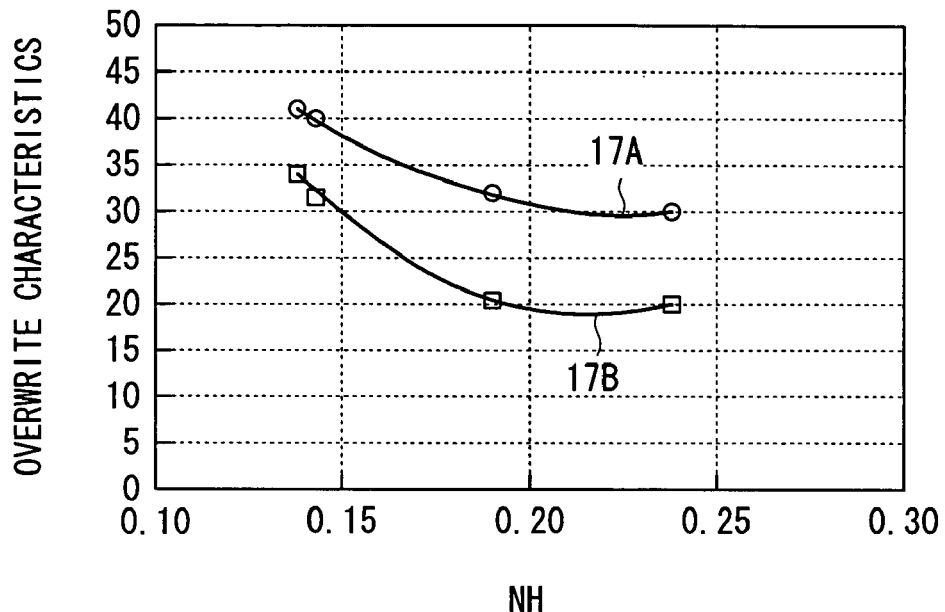
FIG. 17 is a plot showing dependence of overwrite characteristics on a neck height.
Figure 18:
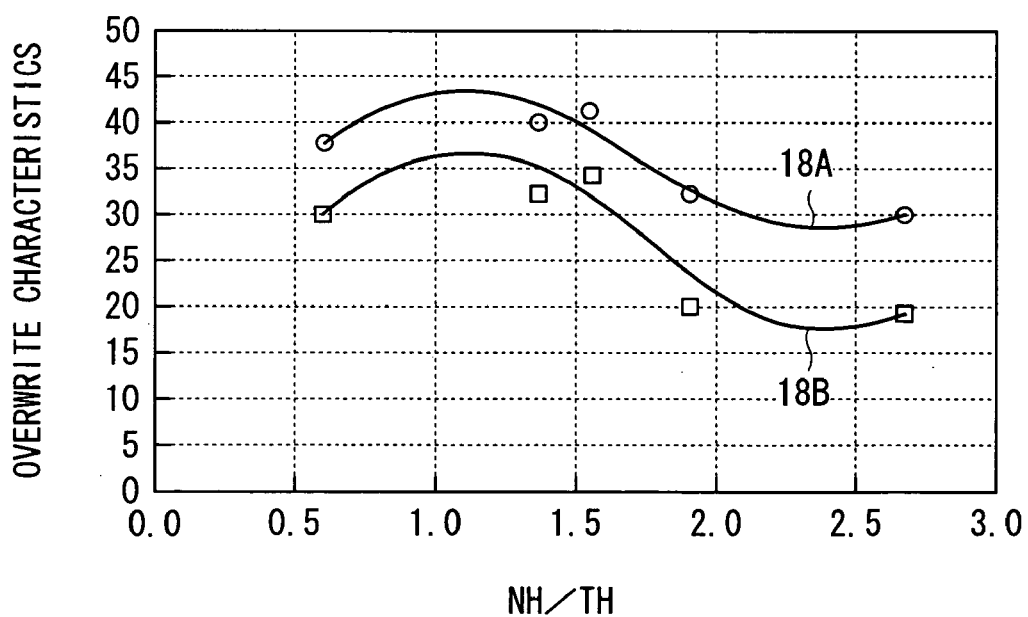
FIG. 18 is a plot showing dependence of overwrite characteristics on a height ratio (neck height/throat height)
Figure 19:
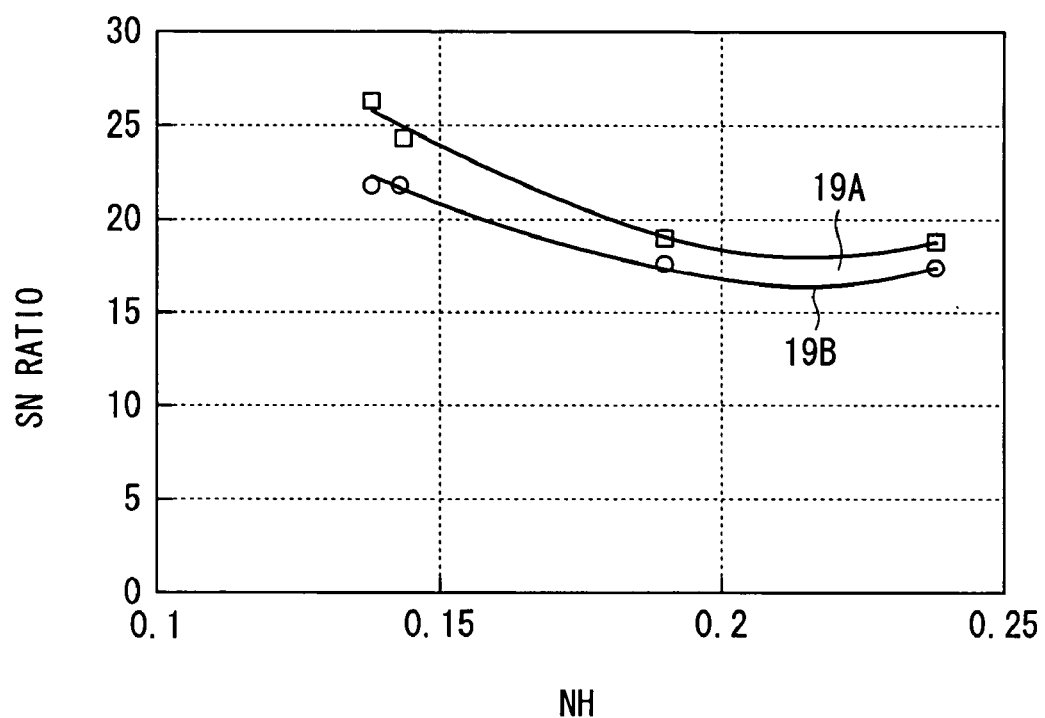
FIG. 19 is a plot showing dependence of a SN ratio on a neck height.

Next, in order to optimize the neck height NH and the height ratio NH/TH of the thin film magnetic head of the invention, in the case where the thickness of the gap layer 12 was fixed at 0.1 µm, overwrite characteristics and the SN ratio were checked. The results shown in FIGS. 17 through 19 were obtained. FIGS. 17 shows the dependence of the overwrite characteristics on the neck height, and FIG. 18 shows the dependence of the overwrite characteristics on the height ratio, and further FIG. 19 shows the dependence of the SN ratio on the neck height. In FIGS. 17 and 19, a "lateral axis" indicates the neck height NH (µm), and a "lateral axis" in FIG. 18 indicates the height ratio NH/TH. In FIGS. 17 and 18, a "vertical axis" indicates the overwrite characteristics (dB), and a "vertical axis" in FIG. 19 indicates the SN ratio (dB). In FIGS. 17 through 19, "17A, 18A and 19A" indicate the case where the width W1 of the front end portion 10A was 0.15 µm, and "17B, 18B and 19B" indicate the case where the width W1 was 0.10 µm.

It was obvious from the result shown in FIG. 17 that the overwrite characteristics changed in a convex downward shape corresponding to a change in the neck height NH. At that time, when attention was given to a difference in the width W1 of the front end portion 10A between 17A and 17B, the overwrite characteristics increased with an increase in the width W1. When the lower limit of the overwrite characteristics required for practical use was 30 dB, the neck height NH which obtained 30 dB or over of the overwrite characteristics was within a range of NH$\leq$0.20 µm (=W1+0.05 µm) in the case of the width W1=0.15 µm (17A), and within a range of NH$\leq$0.15 µm(=W1+0.05 µm) in the case of the width W1=0.10 µm (17B). Therefore, it was confirmed that when the neck height NH was within a range of NH$\leq$W1+0.05 µm, the overwrite characteristics could be secured.

Moreover, it was obvious from the result shown in FIG. 18 that the overwrite characteristics changed to include a convex upward region and a convex downward region depending upon a change in the height ratio NH/TH, and specifically the larger the width W1 of the front end portion 10A was, the higher the characteristics became (18A and 18B). The height ratio NH/TH in the case where the overwrite characteristics were 30 dB or over was within a range of NH/TH$\leq$2.1 µm in the case of the width W1=0.15 µm (18A), and within a range of 0.5 µm<NH/TH<1.6 µm in the case of the width W1=0.10 µm (18B). Therefore, it was confirmed that when the height ratio NH/TH was within a range of 0.5<NH/TH<1.6, the overwrite characteristics could be secured irrespective of the width W1 of the front end portion 10A.

Further, it was obvious from the result shown in FIG. 19 that the SN ratio changed in a convex downward shape with a change in the neck height NH, and specifically, the larger the width W1 of the front end portion 10A was, the higher the SN ratio became (19A and 19B). When the SN ratio was required to be higher than 18 dB for practical use, the neck height NH in the case where the SN ratio was higher than 18 dB was within a range of NH≦0.20 μm(=W1+0.05 μm) in the case of the width W1=0.15 μm (19A), and within a range of NH≦0.15 μm(=W1+0.05 μm) in the case of the width W1=0.10 μm (19B). Therefore, it was confirmed that when the neck height NH was within a range of NH≦W1+0.05 μm, the SN ratio could be secured.

In summary, when the return yoke layer 15 is disposed on the trailing side of the pole layer 20, the gradient of the recording magnetic field becomes steep, so the SN ratio is improved. More specifically, when the thickness of the gap layer 12 is reduced so as to bring the return yoke layer 15 closer to the pole layer 20, the SN ratio is further improved, and when the thickness of the gap layer 12 is approximately 0.2 μm or less, an extremely high SN ratio can be obtained. In this case, as described above, when the return yoke layer 15 is brought closer to the pole layer 20, the overwrite characteristics may decline, but, for example, when the thickness of the gap layer 12 is 0.2 μm or less (for example, 0.1 μm), and the neck height NH is within a range of NH≦W1+0.05 μm, and further the height ratio NH/TH is within a range of 0.5<NH/TH<1.6, even in the case where the return yoke layer 15 is brought closer to the pole layer 20, the overwrite characteristics can be secured. Moreover, the SN ratio may change depending upon the neck height NH or the height ratio NH/TH, but when the neck height NH or the height ratio NH/TH is within the above range, the SN ratio can be secured.

The invention is described referring to the embodiments and the examples, but the invention is not limited to the embodiments and the examples, and can be variously modified. For example, in the embodiments, the case where the invention is applied to a single-pole type head is described, but it is not limited to this. For example, the invention may be applied to a ring-type head. Further, in the embodiments, the case where the invention is applied to a composite thin film magnetic head is described, but it is not limited to this. The invention is applicable to, for example, a thin film magnetic head for recording only comprising an inductive magnetic transducer for writing or a thin film magnetic head having an inductive magnetic transducer for recording/reproducing. In addition, the invention is applicable to a thin film magnetic head with a structure in which a device for writing and a device for reproducing are inversely laminated.

As described above, the thin film magnetic head according to the invention or the magnetic recording apparatus according to the invention comprises the return pole layer disposed on the medium-outgoing side of the pole layer, and the distance NH is within a range of NH≦W1+0.05 μm, and the distance ratio NH/TH is within a range of 0.5<NH/TH<1.6, so the distance NH and the distance ratio NH/TH which have an influence on the recording characteristics can become appropriate. Therefore, even in the case where the return pole layer is disposed on the medium-outgoing side of the pole layer, the recording characteristics can be secured.

Moreover, in the thin film magnetic head according to the invention, when the thickness of the gap layer is 0.2 μm or less, the SN ratio can be further improved.

Further, in the thin film magnetic head according to the invention, when the dimension of the return pole end surface in a thickness direction is 5 or more times larger than the dimension of the pole end surface in a thickness direction, the area of the return pole end surface is larger than the area of the pole end surface, so unintended writing by the return pole layer can be prevented. In addition, in this case, when the width of the return pole end surface is equal to or larger than the width of the pole end surface, it can contribute the prevention of unintended writing by the return pole layer.

Still further, in the thin film magnetic head according to the invention, when the return pole layer includes the first return pole layer portion extending from the recording-medium-facing surface to the forefront end position of the insulating layer, and the second return pole layer portion extending from the recording-medium-facing surface to the back gap and being connected to the first return pole layer portion and the pole layer, the forefront end position of the insulating layer is always determined by the position of the first return pole layer portion, so the throat height which is one factor to determine the recording performance of the thin film magnetic head can be precisely controlled.

Further, in the thin film magnetic head according to the invention, when the pole layer includes the main pole layer including the first and the second pole layer portions, and the auxiliary pole layer being disposed on the medium-incoming side of the main pole layer so as to extend from a position behind the recording-medium-facing surface to a position away from the position and be connected to the main pole layer, while the size of a magnetic flux emission opening can be reduced, the magnetic volume can be secured. Therefore, the recording magnetic field strength can be improved.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head, comprising:
a thin film coil generating a magnetic flux;
an insulating layer electrically separating the thin film coil from its surroundings;
a pole layer including a first pole layer portion and a second pole layer portion, and emitting the magnetic flux generated in the thin film coil toward the recording medium, the first pole layer portion extending from a recording-medium-facing surface to face a recording medium moving in a predetermined direction of medium movement to a direction away from the recording-medium-facing surface and having an uniform width determining a recording track width, the second pole layer portion being connected to the rear of the first pole layer portion and having a larger width than that of the first pole layer portion; and
a return pole layer being disposed on a medium-outgoing side of the pole layer in the direction of medium movement so as to face the pole layer with a gap layer in between on a side closer to the recording-medium-facing surface and connected to the pole layer in a back gap on a side farther from the recording-medium-facing surface, the return pole layer returning the magnetic flux emitted from the pole layer to magnetize the recording medium,
wherein a width of the first pole layer portion in the pole layer is W1 (μm), and a distance between the recording-medium-facing surface and a widening position where the width of the pole layer expands from the first pole layer portion to the second pole layer portion is NH (μm), and a distance between the recording-medium-facing surface and the forefront end position of the insulating layer is TH (μm), the distance NH is within a range of NH≦W1+0.05 μm, and a distance ratio NH/TH is within a range of 0.5<NH/TH<1.6.

2. A thin film magnetic head according to claim 1, wherein the thickness of the gap layer is 0.2 μm or less.

3. A thin film magnetic head according to claim 1, wherein the pole layer has a pole end surface exposed to the recording-medium-facing surface, and the return pole layer has a return pole end surface exposed to the recording-medium-facing surface, and a dimension of the return pole end surface in a thickness direction is 5 or more times larger than a dimension of the pole end surface in a thickness direction.

4. A thin film magnetic head according to claim 3, wherein the width of the return pole end surface is equal to or larger than the width of the pole end surface.

5. A thin film magnetic head according to claim 1, wherein the return pole layer has a continuous structure extending from the recording-medium-facing surface to the back gap.

6. A thin film magnetic head according to claim 1, wherein the return pole layer includes:

a first return pole layer portion extending from the recording-medium-facing surface to the forefront end position of the insulating layer, and a second return pole layer portion extending from the recording-medium-facing surface to the back gap, and being connected to the first return pole layer portion and the pole layer.

7. A thin film magnetic head according to claim 1, wherein the pole layer includes:

a main pole layer including the first and the second pole layer portions, and an auxiliary pole layer being disposed on a medium-incoming side of the main pole layer in the direction of medium movement so as to extend from a position behind the recording-medium-facing surface to a position away from the position and to be connected to the main pole layer.

8. A thin film magnetic head according to claim 1, wherein the pole layer emits a magnetic flux for magnetizing the recording medium in a direction perpendicular to a surface of the recording medium.

9. A magnetic recording apparatus, comprising:

a recording medium; and a thin film magnetic head magnetically recording information on the recording medium, wherein the thin film magnetic head comprises:

a thin film coil generating a magnetic flux;

an insulating layer electrically separating the thin film coil from its surroundings;

a pole layer including a first pole layer portion and a second pole layer portion, and emitting the magnetic flux generated in the thin film coil toward the recording medium, the first pole layer portion extending from a recording-medium-facing surface to face a recording medium moving in a predetermined direction of medium movement to a direction away from the recording-medium-facing surface and having an uniform width determining a recording track width, the second pole layer portion being connected to the rear of the first pole layer portion and having a larger width than that of the first pole layer portion; and a return pole layer being disposed on a medium-outgoing side of the pole layer in the direction of medium movement so as to face the pole layer with a gap layer in between on a side closer to the recording-medium-facing surface and connected to the pole layer in a back gap on a side farther from the recording-medium-facing surface, the return pole layer returning the magnetic flux emitted from the pole layer to magnetize the recording medium, and a width of the first pole layer portion in the pole layer is W1 (μm), and a distance between the recording-medium-facing surface and a widening position where the width of the pole layer expands from the first pole layer portion to the second pole layer portion is NH (μm), and a distance between the recording-medium-facing surface and the forefront end position of the insulating layer is TH (μm), the distance NH is within a range of NH≦W1+0.05 μm, and a distance ratio NH/TH is within a range of 0.5<NH/TH<1.6.

* * * * *